United States Patent
Yoshida et al.

(10) Patent No.: US 8,711,285 B2
(45) Date of Patent: Apr. 29, 2014

(54) OUTPUT DEVICE, SOURCE APPARATUS, TELEVISION SET, SYSTEM, OUTPUT METHOD, PROGRAM, AND RECORDING MEDIUM

(75) Inventors: Tatsuya Yoshida, Osaka (JP); Tomohiro Nagano, Osaka (JP); Kenichi Kimura, Osaka (JP); Tadamichi Atsumi, Osaka (JP); Taisuke Hara, Osaka (JP); Shuji Daioku, Osaka (JP); Kyohichiroh Sawachika, Osaka (JP); Koji Osaki, Osaka (JP); Ryutaro Mashiko, Osaka (JP); Toru Ueda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/642,400

(22) PCT Filed: Apr. 20, 2011

(86) PCT No.: PCT/JP2011/059765
§ 371 (c)(1),
(2), (4) Date: Oct. 19, 2012

(87) PCT Pub. No.: WO2011/132719
PCT Pub. Date: Oct. 27, 2011

(65) Prior Publication Data
US 2013/0038793 A1 Feb. 14, 2013

(30) Foreign Application Priority Data

Apr. 20, 2010 (JP) ................................. 2010-096655
Jul. 30, 2010 (JP) ................................. 2010-172661
Apr. 20, 2011 (JP) ................................. 2011-094528

(51) Int. Cl.
*H04N 7/00* (2011.01)
*H04N 11/00* (2006.01)
*H04N 5/44* (2011.01)

(52) U.S. Cl.
USPC ............................. 348/552; 348/553; 348/725

(58) Field of Classification Search
USPC ......................................................... 348/552
See application file for complete search history.

(56) References Cited

U.S. PATENT DOCUMENTS

2002/0035621 A1   3/2002   Zintel et al.
2004/0244045 A1   12/2004  Miyamoto et al.
(Continued)

FOREIGN PATENT DOCUMENTS

CN    101202826 A    6/2008
JP    2002-359670 A  12/2002
(Continued)

OTHER PUBLICATIONS

HDMI Specification 1.3a Nov. 10, 2006.*
(Continued)

*Primary Examiner* — Jefferey Harold
*Assistant Examiner* — Michael Teitelbaum
(74) *Attorney, Agent, or Firm* — Birch, Stewart, Kolasch & Birch, LLP

(57) ABSTRACT

Disclosed is a television (1) that outputs a content supplied from a source apparatus, which television includes an address acquiring section (301) that acquires a logical address from the source apparatus, a device type acquiring section (302) that acquires a device type from the source apparatus, and a UI section (305) that identifies which kind of apparatus the source apparatus is, based on a combination of the logical address and the device type.

17 Claims, 18 Drawing Sheets

(56) References Cited

U.S. PATENT DOCUMENTS

| | | |
|---|---|---|
| 2006/0271965 A1 | 11/2006 | Tokimoto et al. |
| 2008/0019494 A1 | 1/2008 | Toda |
| 2008/0120408 A1 | 5/2008 | Kim |
| 2008/0244097 A1* | 10/2008 | Candelore et al. ............... 710/5 |
| 2009/0077492 A1 | 3/2009 | Ida |
| 2009/0174818 A1 | 7/2009 | Morita et al. |
| 2009/0177818 A1* | 7/2009 | Shim et al. ................... 710/100 |
| 2009/0284656 A1 | 11/2009 | Suzuki et al. |
| 2011/0113442 A1* | 5/2011 | Kikkawa ....................... 725/25 |

FOREIGN PATENT DOCUMENTS

| | | |
|---|---|---|
| JP | 2004-357189 A | 12/2004 |
| JP | 2007-312055 | 11/2007 |
| JP | 2008-35189 A | 2/2008 |
| JP | 2008-35192 A | 2/2008 |
| JP | 2008-109341 A | 5/2008 |
| JP | 2009-75763 A | 4/2009 |
| JP | 2009-77045 A | 4/2009 |
| JP | 2009-98903 A | 5/2009 |
| JP | 2009-111869 | 5/2009 |
| JP | 2009-141747 A | 6/2009 |
| JP | 2009-147738 | 7/2009 |
| JP | 2009-177592 A | 8/2009 |
| JP | 2009-188921 A | 8/2009 |
| JP | 2009-225306 A | 10/2009 |
| JP | 2010-4289 A | 1/2010 |
| JP | 2010-68509 A | 3/2010 |
| JP | 2010-178260 | 8/2010 |
| WO | WO 2006/038586 A1 | 4/2006 |

OTHER PUBLICATIONS

"High-Definition Multimedia Interface Specification Version 1.3a," Nov. 10, 2006.

International Search Report issued PCT/JP2011/059765, mailed on May 31, 2011.

"Understanding Universal Plug and Play", XP-002370921, Microsoft, Jun. 2000.

European Search Report for corresponding application No. 11772052.4, dated Jan. 18, 2013.

John Ritchie, "MediaServer:1 Device Template Version 1.01", XP055004074, Jun. 25, 2002.

* cited by examiner

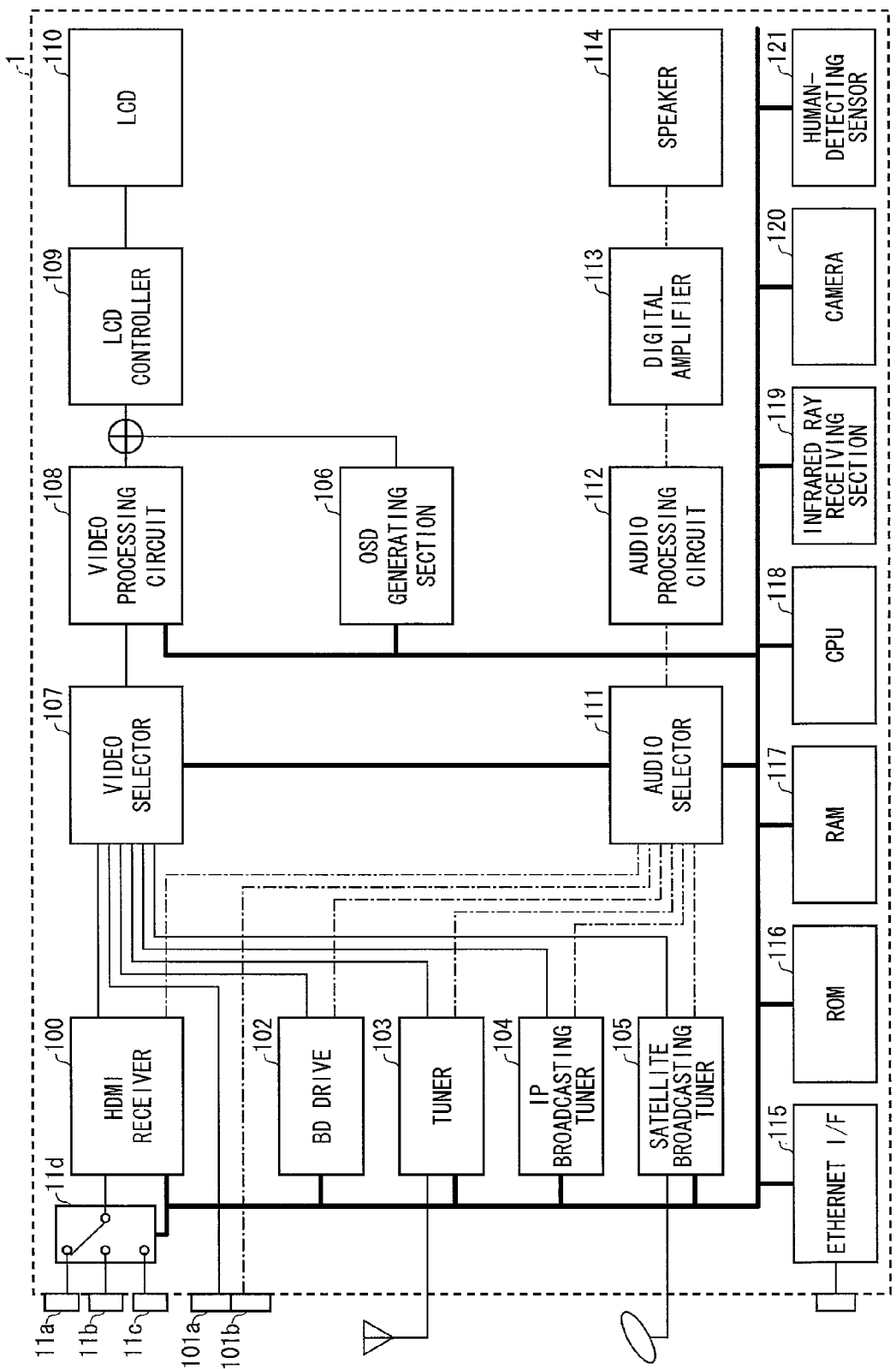
F I G. 4

| No. | PHYSICAL ADDRESS | LOGICAL ADDRESS | DeviceType |
|---|---|---|---|
| 1 | 1.0.0.0 | Player | MobilePhone |
| 2 | – | – | – |
| 3 | – | – | – |
| 4 | – | – | – |

(b)

| No. | PHYSICAL ADDRESS | LOGICAL ADDRESS | DeviceType |
|---|---|---|---|
| 1 | 1.0.0.0 | Player | MobilePhone |
| 2 | 2.0.0.0 | Player | Player |
| 3 | – | – | – |
| 4 | – | – | – |

F I G. 1 7
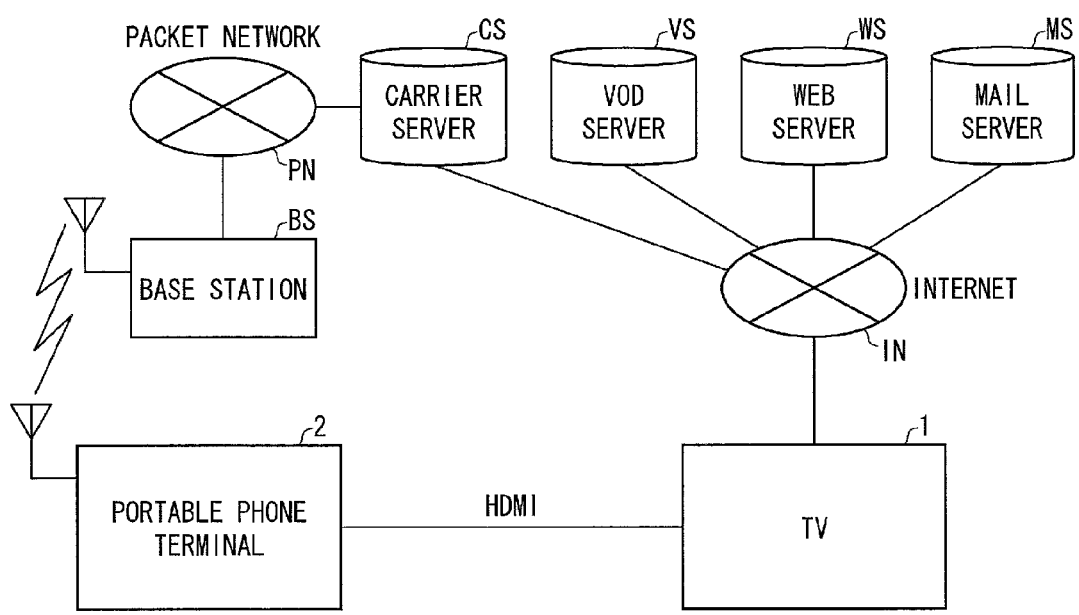

F I G. 1 8
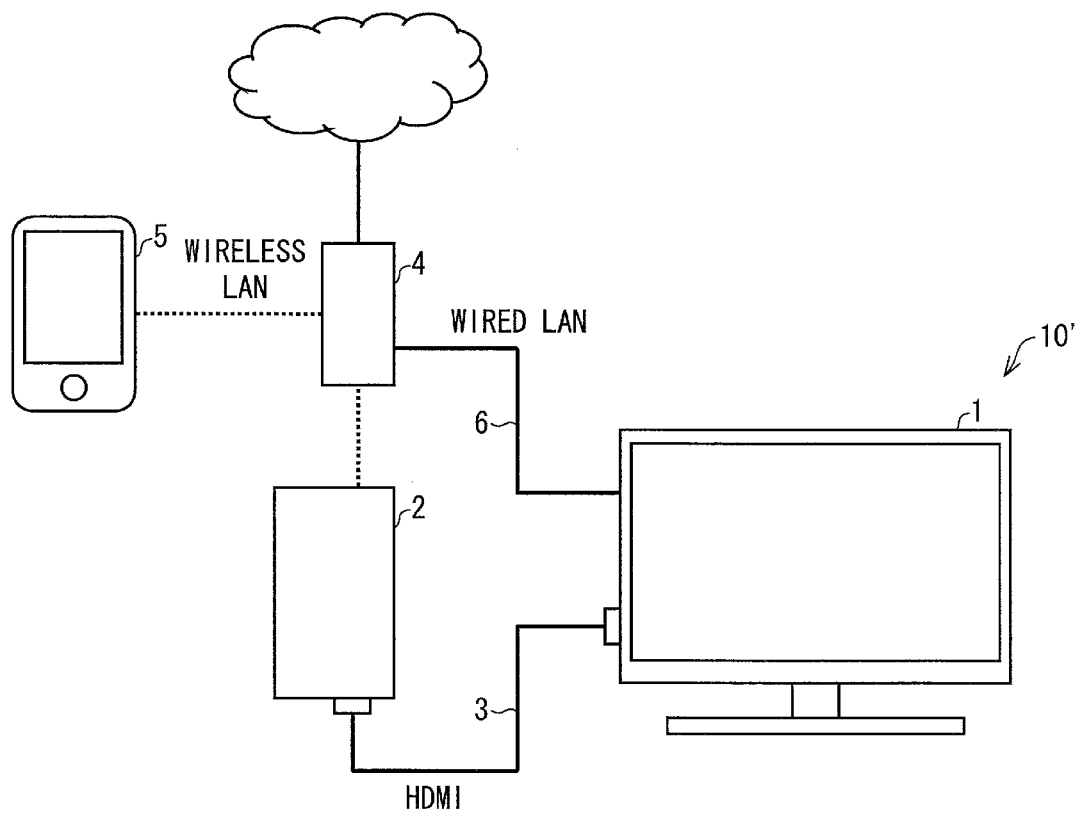

OUTPUT DEVICE, SOURCE APPARATUS, TELEVISION SET, SYSTEM, OUTPUT METHOD, PROGRAM, AND RECORDING MEDIUM

TECHNICAL FIELD

The present invention relates to an output device for outputting a content supplied from a source apparatus, and an output method for outputting the content. Moreover, the present invention relates to a source apparatus for supplying a content to the output device. Furthermore, the present invention relates to a system including the output device, a program for causing a computer to operate as the output device, and a recording medium on which the program is recorded. Furthermore, the present invention relates to a television receiver incorporating the output device.

BACKGROUND ART

In recent years, televisions (television receivers) and PCs (Personal Computers) installed with an interface conforming to the HDMI (High-Definition Multimedia Interface) (registered trademark) standard have become widespread, and it is becoming common to connect these sink apparatuses with source apparatuses (e.g. AV devices) via an HDMI cable. A sink apparatus and a source apparatus connected to each other via the HDMI cable are capable of transmitting and receiving not only video signals and audio signals but also CEC (Consumer Electronics Control) commands to each other.

The CEC commands transmitted and received between devices and apparatuses connected via the HDMI cable include, as arguments, a logical address and/or a physical address of an initiator and/or a destination. The devices and apparatuses connected via the HDMI cable identify the initiator and/or the destination of a CEC command based on the logical address and/or physical address contained in that CEC command.

The logical address here is represented by a natural number from 1 to 15, each of which indicates a kind of apparatus (any one of television (TV), recording device, playback device, tuner device, audio device, or other kind of apparatus). For example, a logical address "0" represents a TV, a logical address "1" represents a first recording device, and a logical address "2" represents a second recording device.

Use of the CEC command allows controlling a source apparatus from a sink apparatus and controlling a sink apparatus from a source apparatus. Thereby, the use of the CEC command allows the users to enjoy convenience, which have not been provided so far. For example, it is possible to automatically switch an input source for the sink apparatus to a source apparatus that has started to playback content. See Non Patent Literature 1 for details of HDMI.

Patent Literature 1 discloses a technique of displaying on a portable phone terminal a user interface for operating (controlling) a TV. By use of the technique disclosed in Patent Literature 1, it is possible to operate (control) a TV with use of a portable phone terminal, without manipulating the TV or the remote controller of the TV.

CITATION LIST

Patent Literature

Patent Literature 1
Japanese Patent Application Publication, Tokukai, No. 2008-109341 A (May 8, 2008)

Non Patent Literature

Non Patent Literature 1
High-Definition Multimedia Interface Specification Version 1.3a, Nov. 10, 2006

SUMMARY OF INVENTION

Technical Problem

However, the conventional TV has a problem in that it is not possible to identify the kind of the source apparatus connected via HDMI more specifically than whether the source apparatus is a playback device, a recording device, a tuner device, or an audio device. This is because the conventional TV uses the logical address, in order to identify the kind of the apparatus of the source apparatus that is connected to the TV via HDMI.

Hence, although it is possible to display a user interface for a playback device, a recording device, a tuner device, or an audio device in a case in which a user interface for operating the source apparatus is to be displayed on the TV, it is not possible to display a user interface for a portable device, for example.

The present invention is accomplished in view of the foregoing problems, and an object thereof is to realize an output device for outputting a content supplied from a source apparatus, which output device is capable of identifying a kind of apparatus of the source apparatus in more details than as conventionally identified.

Solution to Problem

In order to achieve the foregoing object, an output device according to the present invention is an output device for outputting a content supplied from a source apparatus, the output device including: first apparatus kind information acquisition means for acquiring, from the source apparatus, first apparatus kind information indicative of which kind of apparatus the source apparatus is classified into based on a first classification; second apparatus kind information acquisition means for acquiring, from the source apparatus, second apparatus kind information indicative of which kind of apparatus the source apparatus is classified into based on a second classification, the second classification being different from the first classification; and apparatus kind identification means for identifying which kind of apparatus the source apparatus is, on a basis of a combination of the first apparatus kind information acquired by the first apparatus kind information acquisition means and the second apparatus kind information acquired by the second apparatus kind information acquisition means.

Moreover, in order to achieve the foregoing object, an output method according to the present invention is an output method for outputting from an output device a content supplied from a source apparatus, the method including the steps of: (a) the output device acquiring, from the source apparatus, first apparatus kind information indicative of which kind of apparatus the source apparatus is classified into based on the first classification; (b) the output device acquiring, from the source apparatus, second apparatus kind information indicative of which kind of apparatus the source apparatus is classified into based on a second classification, the second classification being different from the first classification; and (c)

the output device identifying which kind of apparatus of the source apparatus is, on a basis of a combination of (i) the first apparatus kind information acquired in the step (a) and (ii) the second apparatus kind information acquired in the step (b).

Moreover, in order to achieve the foregoing object, a source apparatus according to the present invention is a source apparatus for supplying a content to an output device, the source apparatus including: first apparatus kind information providing means for providing to the output device first apparatus kind information indicative of which kind of apparatus the source apparatus is classified into based on a first classification; and second apparatus kind information providing means for providing to the output device second apparatus kind information indicative of which kind of apparatus the source apparatus is classified into based on a second classification, the second classification being different from the first classification.

Moreover, in order to achieve the foregoing object, a system according to the present invention includes the output device and the source apparatus.

According to the foregoing configurations, a kind of apparatus of the source apparatus is identified on a basis of a combination of (i) which kind of apparatus the source apparatus is classified into based on the first classification and (ii) which kind of apparatus the source apparatus is classified into based on the second classification. Hence, it is possible to identify the kind of apparatus of the source apparatus more specifically, as compared to a case in which the kind of apparatus of the source apparatus is identified only by the kind of apparatus based on the first classification. Moreover, it is possible to make source apparatuses of different kinds, classified based on the first classification or classified based on the second classification, to perform different processes.

Note that the source apparatus can be a source apparatus supplying video content, a source apparatus supplying audio content, or an apparatus supplying video content and audio content. Moreover, the source apparatus can be a source apparatus that supplies electronic books. The output device can be an output device (display device) that outputs (displays) video content, an output device that outputs audio content, or an output device that outputs video content and audio content.

Advantageous Effects of Invention

As described above, an output device according to the present invention is an output device for outputting a content supplied from a source apparatus, the output device including: first apparatus kind information acquisition means for acquiring, from the source apparatus, first apparatus kind information indicative of which kind of apparatus the source apparatus is classified into based on a first classification; second apparatus kind information acquisition means for acquiring, from the source apparatus, second apparatus kind information indicative of which kind of apparatus the source apparatus is classified into based on a second classification, the second classification being different from the first classification; and apparatus kind identification means for identifying which kind of apparatus the source apparatus is, on a basis of a combination of the first apparatus kind information acquired by the first apparatus kind information acquisition means and the second apparatus kind information acquired by the second apparatus kind information acquisition means.

Moreover, a source apparatus according to the present invention is a source apparatus for supplying a content to an output device, the source apparatus including: first apparatus kind information providing means for providing to the output device first apparatus kind information indicative of which kind of apparatus the source apparatus is classified into based on a first classification; and second apparatus kind information providing means for providing to the output device second apparatus kind information indicative of which kind of apparatus the source apparatus is classified into based on a second classification, the second classification being different from the first classification.

As a result, it is possible to identify the kind of apparatus of the source apparatus more specifically as compared to a case in which a kind of apparatus of the source apparatus is identified just on the basis of the kind of apparatus based on the first classification.

BRIEF DESCRIPTION OF DRAWINGS

FIG. 4 is a block diagram illustrating a configuration of the TV illustrated in FIG. 2.

FIG. 12 is a view illustrating a configuration and contents of a management table used by the TV illustrated in FIG. 2; (a) illustrates a case in which the portable phone terminal is connected to the TV via HDMI, and (b) illustrates a case in which a BD playback device is connected to the TV via HDMI.

FIG. 17 is a block diagram illustrating one construction example of a system including the TV illustrated in FIG. 2 and the portable phone terminal illustrated in FIG. 5.

FIG. 18 is a block diagram illustrating one construction example of a system capable of operating a TV and a source apparatus from a portable information terminal.

DESCRIPTION OF EMBODIMENTS

Described below is an embodiment of the present invention, with reference to drawings. Note that in the description below, a television receiver (hereinafter referred to as "TV") exemplifies a sink apparatus (output device), and a portable phone terminal exemplifies a source apparatus. The present invention however is not limited to these apparatuses. In particular, the portable phone terminal is merely an example of a portable device that functions as a source apparatus, and may be replaced with other portable devices, for example a PDA (Personal Digital Assistant), a portable digital audio player, or a car navigation system (movable terminal device).

[System Configuration]

Figure 2:
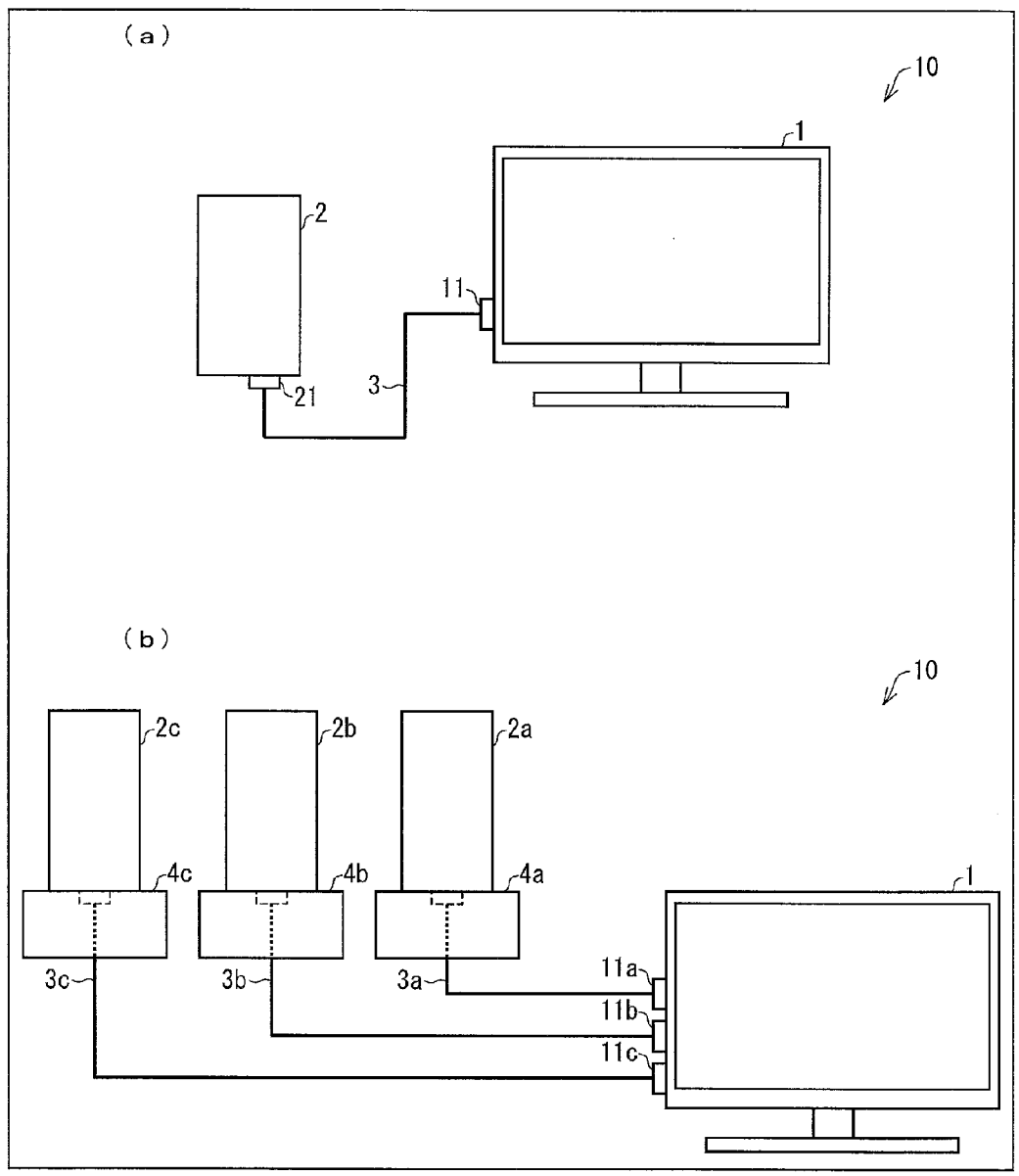
FIG. 2 is a view illustrating a configuration of a system including the TV illustrated in FIG. 1 and a portable phone terminal.

A configuration of a system 10 including a TV 1 and a portable phone terminal 2 is described with reference to FIG. 2. FIG. 2 is a view illustrating a configuration of the system 10.

As illustrated in FIG. 2(a), the system 10 includes a TV 1 having a HDMI input terminal 11, and a portable phone terminal 2 having a HDMI output terminal 21. The system 10 is configured so that the HDMI input terminal 11 of the TV 1 is connected to the HDMI output terminal 21 of the portable phone terminal 2 via a HDMI cable 3. In the system 10, the portable phone terminal 2 functions as a source apparatus that supplies content to the TV 1, and the TV 1 functions as a sink apparatus that outputs the content supplied from the portable phone terminal 2. The content supplied from the portable phone terminal 2 and outputted by the TV 1 may be video, audio, or both video and audio.

Moreover, as illustrated in FIG. 2(b), the system 10 can include a TV 1 having N (three (3) in the embodiment) HDMI input terminals 11a to 11c, and include not more than N (three (3) in the embodiment) portable phone terminals 2a to 2c. In this case, the TV 1 is connected to the portable phone terminals 2a to 2c via HDMI cables 3a to 3c, via the HDMI input terminals 11a to 11c provided to the TV 1, in such a manner that the HDMI cable 3a connects the portable phone terminal 2a to the TV 1 via the HDMI input terminal 11a, the HDMI cable 3b connects the portable phone terminal 2b to the TV 1 via the HDMI input terminal 11b, and the HDMI cable 3c connects the portable phone terminal 2c to the TV 1 via the HDMI input terminal 11c. Note that in the example illustrated in FIG. 2(b), an HDMI connection is established between the TV 1 and the portable phone terminals 2a to 2c by placing the portable phone terminals 2a to 2c on respective stands 4a to 4c (charging stand 4 etc. later described), so that each of the portable phone terminals 2a to 2c is connected to one end of its respective one of the HDMI cables 3a to 3c.

The aspect of the connection connecting the TV 1 with the portable phone terminal 2 via HDMI is not limited to those illustrated in FIG. 2(a) and FIG. 2(b). It is also possible to employ a configuration in which the TV 1 is connected to the portable phone terminal 2 with use of a charging stand 4, as illustrated in FIG. 3(a) and FIG. 3(b).

The charging stand 4 illustrated in FIG. 3(a) has a HDMI input terminal 41 and a power terminal 42. When the portable phone terminal 2 is placed on the charging stand 4, the HDMI output terminal 21 and the power terminal 22 of the portable phone terminal 2 are connected with the HDMI input terminal 41 and power terminal 42 of the charging stand 4, respectively. The HDMI input terminal 41 of the charging stand 4 is connected to a HDMI cable 43. By connecting the other end of the HDMI cable 43 to the HDMI input terminal 11 of the TV 1, the TV 1 is connected to the portable phone terminal 2 via HDMI. Moreover, the power terminal 42 of the charging stand 4 is connected to a power cable 44. By connecting an AC adapter provided on the other end of the power cable 44 to a commercial power source, it is possible to supply electricity to the portable phone terminal 2.

The charging stand 4 illustrated in FIG. 3(b) has, as with the charging stand 4 illustrated in FIG. 3(a), a HDMI input terminal 41 and a power terminal 42. When the portable phone terminal 2 is placed on the charging stand 4, the HDMI output terminal 21 and the power terminal 22 of the portable phone terminal 2 connect with the respective HDMI input terminal 41 and power terminal 42 of the charging stand 4. The HDMI input terminal 41 is connected to one end of a HDMI cable 43. By connecting the other end of the HDMI cable 43 to the HDMI input terminal 11 of the TV 1, it is possible to connect the TV 1 to the portable phone terminal 2 via HDMI. Moreover, the power terminal 42 is connected to one end of a power cable 44. By connecting the other end of the power cable 44 to an AC adapter 12 built-in in the TV 1, it is possible to supply electricity to the portable phone terminal 2. Note that one cable may be used to function as the HDMI cable 43 and the power cable 44, so that it is possible to carry out both the HDMI connection via and electricity supply with use of the one cable.

Moreover, it is possible to employ a configuration in which the TV 1 is directly connected with the portable phone terminal 2 via HDMI without using the HDMI cable 3, as illustrated in FIG. 3(c). The TV 1 illustrated in FIG. 3(c) has a slot 13. When the portable phone terminal 2 is loaded to the slot 13, the HDMI output terminal 21 of the portable phone terminal 2 is directly connected to the HDMI input terminal 41 of the TV 1 provided inside the slot 13. Note that instead of the configuration in which the portable phone terminal 2 is loaded to the TV 1 from a side surface of the TV 1, it is also possible to employ a configuration in which the portable phone terminal 2 is loaded on a bezel section of the TV 1 (bezel section provided lower of the LCD) from the front.

[TV Configuration]

Next described is a configuration of the TV 1 according to the present embodiment, with reference to FIG. 4. FIG. 4 is a block diagram illustrating a configuration of the TV 1.

As illustrated in FIG. 4, the TV 1 includes three HDMI input terminals 11a to 11c, a HDMI switch 11d, a HDMI receiver 100, a video input terminal 101a, an audio input terminal 101b, a BD drive 102, a tuner 103, an IP broadcasting tuner 104, a satellite broadcasting tuner 105, an OSD generating section 106, a video selector 107, a video processing circuit 108, an LCD controller 109, an LCD (Liquid Crystal Display) 110, an audio selector 111, an audio processing circuit 112, a digital amplifier 113, a speaker 114, Ethernet I/F 115, a ROM (Read-Only Memory) 116, a RAM (Random Access Memory) 117, a CPU (Central Processing Unit) 118, an infrared ray receiving section 119, a camera 120, and a human-detecting sensor 121. In FIG. 4, paths for a video signal are illustrated by solid lines, paths for an audio signal are illustrated by alternate long and short dash lines, and paths for data and control signals are illustrated by bold lines.

Supplied to the video selector 107 are (1) video received by the HDMI receiver 100, (2) video inputted via the video input terminal 101a, (3) video retrieved from a BD (Blu-ray Disc) by the BD drive 102, (4) video received via the (terrestrial digital broadcasting) tuner 103, (5) video received via the IP broadcasting tuner 104, and (6) video received via the satellite broadcasting tuner 105. Moreover, supplied to the audio selector 111 are (1) audio received by the HDMI receiver 100, (2) audio inputted via the audio input terminal 101b, (3) audio retrieved from a BD by the BD drive 102, (4) audio received via the tuner 103, (5) audio received via an IP broadcasting tuner 104, and (6) audio received via the satellite broadcasting tuner 105.

A CPU 118 performs selection control for determining the following (a) to (d): (a) which one of the HDMI input terminals is selected to supply the HDMI receiver 101 with a content inputted via the HDMI input terminal, i.e. via which one of the HDMI input terminals the HDMI switch 11d supplies the content to the HDMI receiver; (b) which channel is selected to supply the tuner 103 with a content transmitted via the channel; (c) which one of servers is selected to supply the IP broadcasting tuner 104 with a content distributed from the server, and (d) which one of channels is selected to supply the satellite broadcasting tuner 105 with a content transmitted via the channel. Moreover, the CPU 118 further performs reproduction control in the BD drive 102 such as playback, stop, fast forward, rewind, chapter transition and the like.

The video selector 107 selects any one of (1) the video supplied from the HDMI receiver 100, (2) the video supplied via the video input terminal 101a, (3) the video supplied from the BD drive 102, (4) the video supplied from the tuner 103, (5) the video supplied from the IP broadcasting tuner 104, and (6) the video supplied from the satellite broadcasting tuner 105. The video selected by the video selector 107 is supplied to the video processing circuit 108. Note that the CPU 118 controls which of the videos the video selector 107 selects.

The video processing circuit 108 adjusts image quality of the video supplied from the video selector 107. Moreover, the video processing circuit 108 performs scaling to the video supplied from the video selector 107. Here, the adjustment of the image quality is for example to modify at least one of brightness, sharpness, and contrast. Moreover, the scaling is indicative of shrinking a size of a video while maintaining an original aspect ratio of the video to be displayed. The video that has been subjected to the image quality adjustment and scaling by the video processing circuit 108 is supplied to the LCD controller 109. Note that the CPU 118 controls how the image quality is modified by the video processing circuit 108 and to what degree the video is shrunk in size.

The LCD controller 109 controls the LCD 110 to display on the LCD 110 the video supplied from the video processing circuit 108, thereby controlling the LCD 110 to output the video selected by the video selector 107. In a case in which an OSD image is supplied from the OSD generating section 106, the LCD controller 109 controls to display the OSD image supplied from the OSD generating section 106 so that the OSD image is superimposed on the video supplied from the video processing circuit 108.

The audio selector 111 selects any one of (i) an audio supplied from the HDMI receiver 100, (ii) an audio supplied via the video input terminal 101a, (iii) an audio supplied from the BD drive 102, (iv) an audio supplied from the tuner 103, (v) an audio supplied from the IP broadcasting tuner 104, and (vi) an audio supplied from the satellite broadcasting tuner 105. The audio selected by the audio selector 111 is supplied to the audio processing circuit 112. Note that the CPU 118 controls which audio the audio selector 111 selects. However, the selection of the video by the video selector 107 and the selection of the audio by the audio selector 111 work in communication with each other. For example, when the video selector 107 selects a video supplied from the HDMI receiver 100, the audio selector 111 also selects an audio supplied from the HDMI receiver 100.

The audio processing circuit 112 adjusts volume and sound quality of the audio supplied from the audio selector 111. The adjustment of sound quality is to modify frequency characteristics (e.g. emphasizing low frequencies and emphasizing high frequencies) of the audio supplied from the audio selector 111. The audio adjusted in its volume and sound quality by the audio processing circuit 112 is supplied to the digital amplifier 113. Note that the CPU 118 controls how the volume and sound quality is modified by the audio processing circuit 112.

The digital amplifier 113 causes a speaker 114 to output the audio supplied from the audio processing circuit 112. As a result, the audio selected from the audio selector 111 is outputted from the speaker 114.

The CPU 118 controls the sections described above in response to a remote controller signal received by an infrared ray receiving section 119, an image captured by a camera 120, and an output signal outputted by the human-detecting sensor 121. An output signal of the human-detecting sensor 121 is a binary signal indicative of whether or not a viewer is present within that sensed range. The control performed by use of the infrared ray receiving section 119 includes, for example, controlling to switch channels selected by the tuner 104 in response to a remote controller signal, and controlling to switch a video and audio selected by the respective video selector 107 and audio selector 111, in response to a remote controller signal. Moreover, a control performed by use of the camera 120 includes, for example, controlling to switch how to adjust image quality in the video processing circuit 108, in response to a viewer identified based on a captured image. Moreover, an example of the control by use of the human-detecting sensor 121 includes controlling to switch between whether to turn ON or turn OFF the backlight of the LCD 110 in response to a sensed result.

Moreover, the CPU 118 realizes cooperative operation with the portable phone terminal 2 by, for example, causing the HDMI receiver 100 to execute a CEC command received from the portable phone terminal 2, or causing the HDMI receiver 100 to generate a CEC command to be transmitted to the portable phone terminal 2. The cooperative operation between the TV 1 and the portable phone terminal 2 by use of the CEC command is described later in details with reference to different drawings.

The ROM 116 is a readable but a non-writable memory in which fixed data such as a program to be executed by the CPU 118 is stored. This ROM 116 also stores JPEG data and SVG (Scalable Vector Graphics) data referred to by the OSD generating section 106 for generating an OSD image. On the other hand, the RAM 117 is a readable and writable memory in which (i) data to be referred to by the CPU 118 for calculation and (ii) variable data such as data generated as a result of calculation by the CPU 118 are stored.

Ethernet I/F 115 is an interface for connecting the TV 1 to a network. The IP broadcasting tuner 105 described above accesses a server on the Internet via the Ethernet I/F 115.

As described later, the TV 1 has a communication function. Namely, the TV 1 is capable of executing communication applications such as an e-mail client, a web browser, and an application for telephonic communication. Such functions are realized by the CPU 118 executing a program stored in the ROM 116. In a case in which the TV 1 has a function of telephonic communication, it is desirable to install a microphone in the TV 1 (or in a remote controller for operating the TV 1) for picking up a voice of a user during the telephonic communication.

[Configuration of Portable Phone Terminal]

Figure 5:
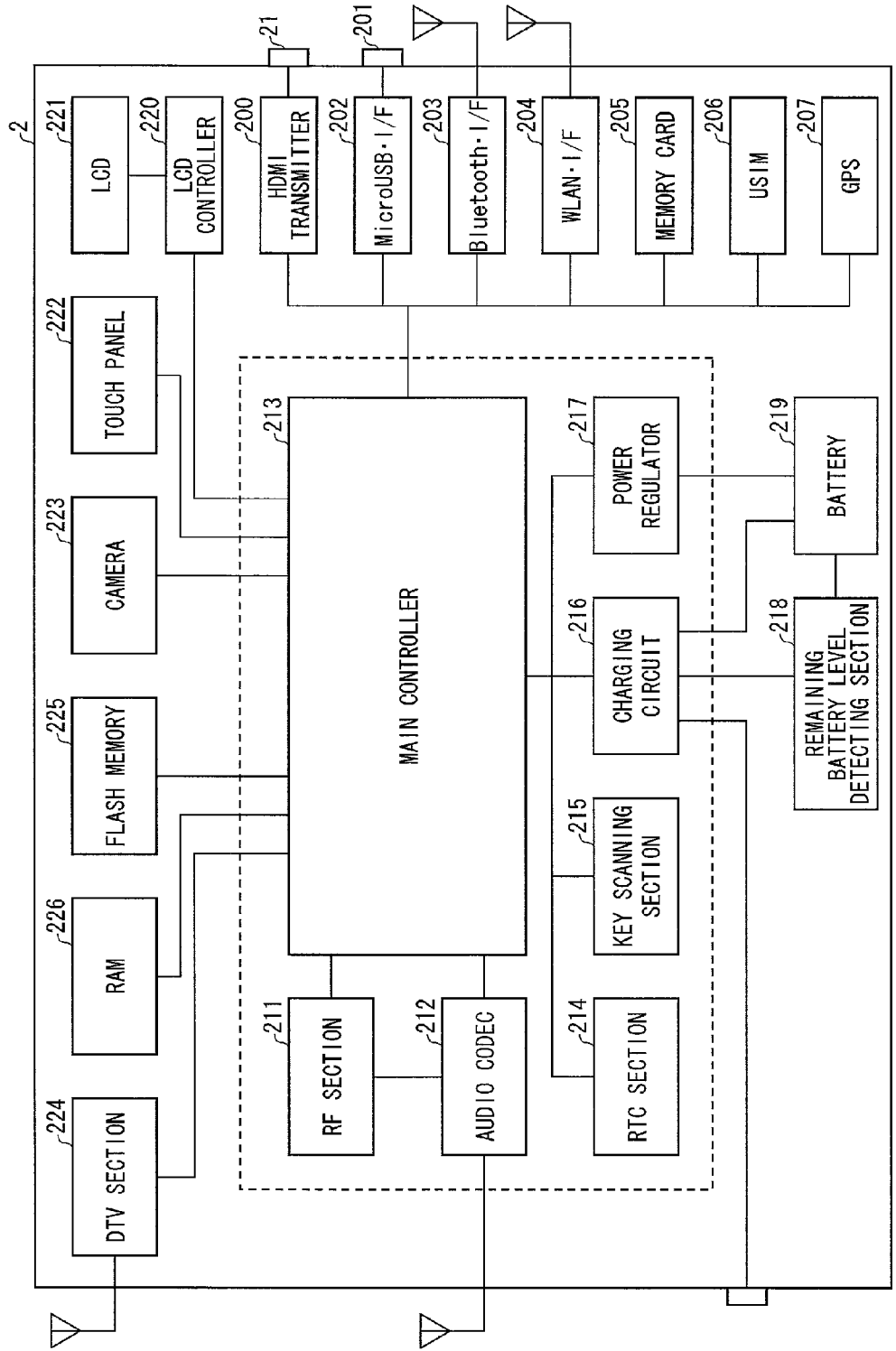
FIG. 5 is a block diagram illustrating a configuration of the portable phone terminal illustrated in FIG. 2.

The next description discusses a configuration of the portable phone terminal 2, with reference to FIG. 5. FIG. 5 is a block diagram illustrating a configuration of the portable phone terminal 2.

As illustrated in FIG. 5, the portable phone terminal 2 includes a HDMI output terminal 21, a HDMI transmitter 200, a micro USB terminal 201, micro USB•I/F 202, a Bluetooth•I/F 203, a WLAN (Wireless LAN)•I/F 204, a memory card 205 (detachable), a USIM (Universal Subscriber Identity Module) card 206 (detachable), a GPS (Global positioning system) 207, a RF section 211, an audio CODEC 212, a main controller 213, a RTC (Real Time Clock) section 214, a key scanning section 215, a charging circuit 216, a power regulator 217, a remaining battery level detecting section 218, a battery 219, an LCD controller 220, a LCD 221, a touch panel 222, a camera 223, a DTV section 224, a FLASH memory 225, and a RAM 226. In FIG. 5, a block that is to be mounted on a main substrate together with the main controller 213 is indicated by dotted lines.

The portable phone terminal 2 has (1) a function for telephonic communication realized mainly by the RF section 211 and the audio CODEC section 212, (2) an image capturing function realized mainly by the camera 223, (3) a reception function of one-segment broadcasting realized mainly by the DTV section 225, (4) an electricity supplying function realized mainly by the battery 219 and the power regulator 217, (5) a charging function realized mainly by the charging circuit 216, the remaining battery level detecting section 218, and the battery 219, (6) a wireless communication function realized mainly by the Bluetooth•I/F 203 or WLAN•I/F 204, (7) a position management function realized mainly by the GPS 207, (8) a time management function realized mainly by the RTC 214, and (9) a user operation detection function realized mainly by the key scanning section 215 or the touch panel 222. However, these functions are regular functions provided in a conventional portable phone terminal 2, so hence descriptions thereof have been omitted.

The portable phone terminal 2 has, other than these functions, a content playback function for playing back content. The portable phone terminal 2 is capable of playing back content such as a still image, a moving image, and audio. The playing back of the still image, moving image, or audio is for example carried out by decoding still image data (e.g. JPEG data), moving image data (e.g. MPEG data), or audio data (e.g. MP3 data), each of which is retrieved by the main controller 213 from the FLASH memory 226. Instead of the FLASH memory 226, the main controller 213 can decode still image data, moving image data, or audio data retrieved from a USB device connected to a Micro USB terminal or retrieved from a memory card 205. The content decoded by the main controller 213 is supplied to the HDMI transmitter 200. The HDMI transmitter 200 transmits the content supplied from the main controller 213 to the TV 1 connected via the HDMI cable 3.

Moreover, the portable phone terminal 2 has a function for executing communication applications. Communication applications executable by the portable phone terminal 2 include those utilizing communication with a base station by use of the RF section 211, and those utilizing short-distance wireless communication by use of the Bluetooth•I/F 203 or WLAN•I/F 204 (applications using the Internet may be installed as the former communication application or the latter communication application). Specific examples of the communication application include, in addition to multipurpose applications such as an e-mail client and a web browser, applications exclusively for use of various web services.

Furthermore, the main controller 213 realizes cooperative operation with the TV 1 by controlling the HDMI transmitter 200 to execute a CEC command received from the TV 1 or by controlling the HDMI transmitter 200 to generate a CEC command to be sent to the TV 1. For example, when the HDMI transmitter 200 receives a <Give Physical Address> command, the main controller 213 controls the HDMI transmitter 200 to transmit a <Report Physical Address> command that includes a physical address and logical address (Playback Device) of the portable phone terminal 2 as arguments. Moreover, when the HDMI transmitter 200 receives a <Give Device Type> command, the main controller 213 controls the HDMI transmitter 200 to transmit a <Report Device Type> command that includes a device type of the portable phone terminal 2, i.e., "Mobile Phone", as an argument. The cooperative operation with the TV 1 and the portable phone terminal 2 with use of the CEC command is described in details later, having different drawings be referred to for reference.

[Details of HDMI Transmitter and HDMI Receiver]

Figure 6:
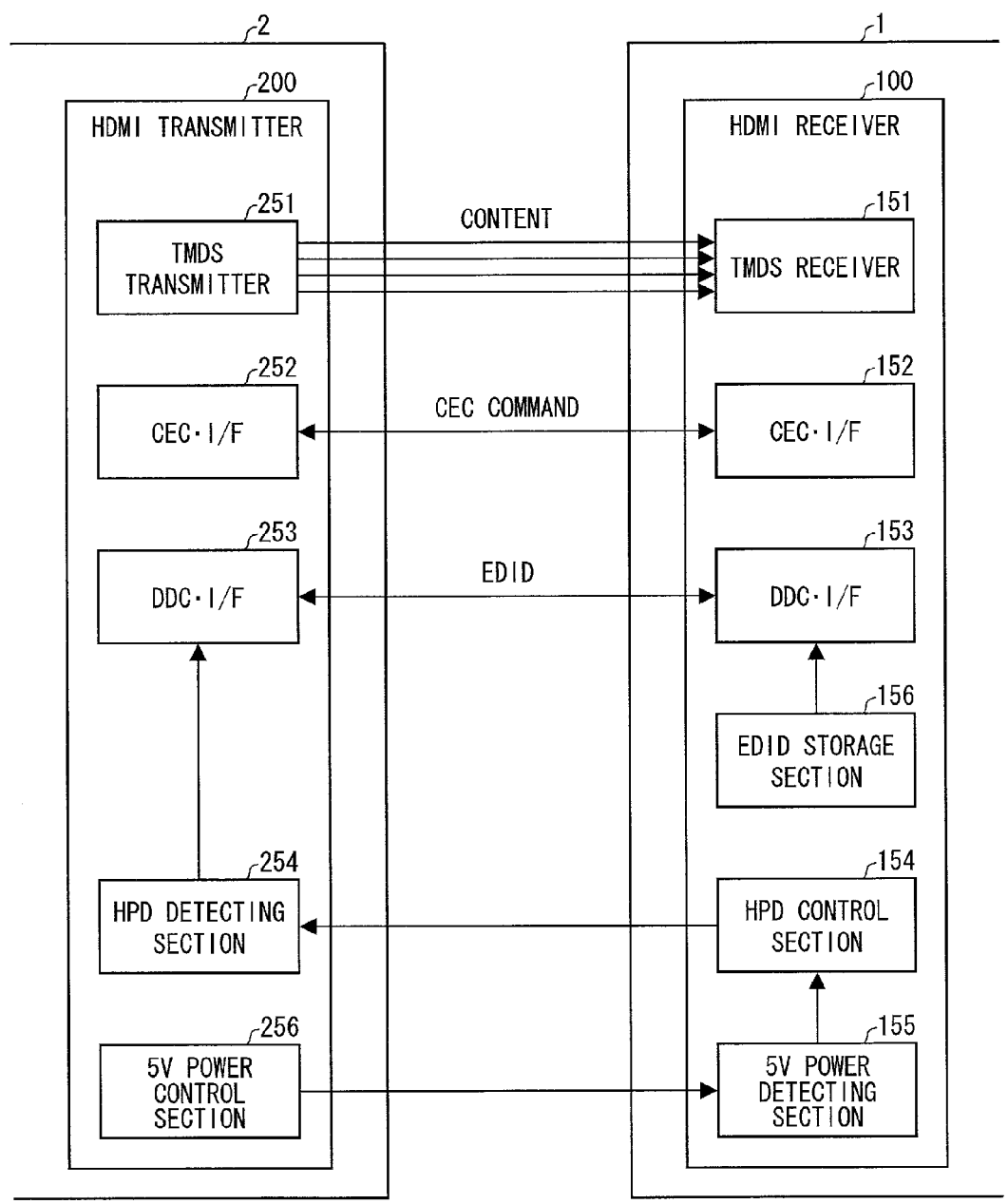
FIG. 6 is a block diagram illustrating a configuration of a HDMI receiver provided in the TV illustrated in FIG. 2, and a configuration of a HDMI transmitter provided in the portable phone terminal illustrated in FIG. 2.

The following description further specifically describes the HDMI receiver 100 provided in the TV 1 and the HDMI transmitter 200 provided in the portable phone terminal 2, with reference to FIG. 6. FIG. 6 is a block diagram illustrating a configuration of the HDMI receiver 100 and the HDMI transmitter 200.

The HDMI cable 3 includes a TMDS (Transition Minimized Differential Signaling) line for transmitting content (video signals and audio signals), a CEC line for transmitting a CEC (Consumer Electronics Control) command, a DDC (Display Data Cannel) line for transmitting EDID (Extended Display Identification Data), an HPD line for transmitting an HPD (Hot Plug Detect) signal, and a 5V power line whose voltage (with respect to a ground potential) is controlled to be 5 V by a source apparatus for detecting connection.

The HDMI receiver 100 includes a TMDS receiver 151, a CEC•I/F 152, a DDC•I/F 153, an HPD control section 154, a 5V power detecting section 155, and an EDID storage section 156. Each of the sections included in the HDMI receiver 100 is controlled by the CPU 118.

The TMDS receiver 151 is an interface for receiving content transmitted via the TMDS line in the HDMI cable 3. The content received by the TMDS receiver 151 is supplied to the video selector 107 and the audio selector 111.

The CEC•I/F 152 is an interface for receiving a CEC command transmitted via the CEC line in the HDMI cable 3. The CEC command received by the CEC•I/F 152 is supplied to the CPU 118. In addition, the CEC•I/F 152 is an interface for transmitting a CEC command via the CEC line in the HDMI cable 3. The CEC command transmitted by the CEC•I/F 152 is supplied from the CPU 118.

The DDC•I/F 153 is an interface for transmitting EDID through the DDC line in the HDMI cable 3. The EDID that the DDC•I/F 153 transmits is retrieved from the EDID storage section 156.

The 5V power detecting section 155 monitors a voltage of the 5V power pin to which the 5V power line in the HDMI cable 3 is connected, to detect a rise timing of the voltage.

Upon detecting that the voltage of the 5V power pin has risen to 5 V, the 5V power detecting section 155 notifies the CPU 118 and the HPD control section 154 that the connection with the HDMI transmitter 200 is established. When the HPD control section 154 receives the notification from the 5V power detection section 155, the HPD control section 154 controls the voltage of the HPD pin connected to the HPD line in the HDMI cable 3 to rise to a H (high) level. The HDMI transmitter 200, after the voltage of the HPD pin connected to the HPD line in the HDMI cable 3 rises to the H level, retrieves an EDID stored in the EDID storage section 156 of the HDMI receiver 100, via the DDC line.

(Details of HDMI Transmitter 200)

The HDMI transmitter 200 includes a TMDS transmitter 251, a CEC•I/F 252, a DDC•I/F 253, an HPD detecting section 254, and a 5V power control section 255. The main controller 213 controls each of the sections provided in the HDMI transmitter 200.

The TMDS transmitter 251 is an interface for transmitting content via the TMDS line in the HDMI cable 3. The content transmitted via the TMDS transmitter 251 is content that is decoded by the main controller 213.

The CEC•I/F 252 is an interface for receiving a CEC command transmitted via the CEC line in the HDMI cable 3. The CEC command received by the CEC•I/F 252 is supplied to the main controller 213. Moreover, the CEC•I/F 252 is an interface for transmitting the CEC command via the CEC line in the HDMI cable 3. The CEC command transmitted by the CEC•I/F 252 is supplied from the main controller 213.

The DDC•I/F 253 is an interface for receiving an EDID transmitted via the DDC line in the HDMI cable 3. The EDID received by the DDC•I/F 253 is stored in the RAM 227 via the main controller 213.

So that it is possible to detect the connection of the HDMI receiver 100 to the HDMI transmitter 200, the 5V power control section 255 controls the voltage of the 5V power pin connected to the 5V power line in the HDMI cable 3, to 5 V. The HPD detecting section 254 monitors the voltage of the HPD pin to which the HPD line in the HDMI cable 3 is connected, to detect a rise timing of the voltage. When the HPD detecting section 254 detects that the voltage of the HPD pin has risen to a H level, the HPD detecting section 254 notifies the main controller 213 and the DDC•I/F 253 that the connection is established with a respective sink apparatus. Upon receiving the notification from the HPD detecting section 254, the DDC•I/F 253 retrieves an EDID stored in the EDID storage section 156 via the DDC•I/F in the HDMI receiver 100.

The CEC command transmitted and received between the apparatuses connected via the HDMI cable includes, as arguments, a logical address and/or a physical address of a initiator or and/or a destination. The apparatuses connected via the HDMI cable identify the initiator and/or the destination of the CEC command based on the logical address and/or the physical address contained in the CEC command.

In the embodiment, the logical address is represented by a natural number from 1 to 15, each of which indicates a kind of apparatus (any one of TV, recording device, playback device, tuner device, and audio device). For example, a logical address "0" represents a TV, a logical address "1" represents a first recording device, and a logical address "2" represents a second recording device. Note that a corresponding relationship between the logical address and the kind of apparatus is defined as in the following Table. In the present specification, "TV", "Recording Device 1-3", "Playback Device 1-3", "Tuner 1-4", and "Audio System", each in the Table below, may also be referred to as "TV", "recording device", "playback device", "tuner device", and "audio device", respectively.

TABLE 1

| Logical address | Kind of Apparatus |
| --- | --- |
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use |
| 15 | Unregistered |

On the other hand, the physical address is represented by a four-digit natural number indicative of a path from a source apparatus. For example, a physical address (x,0,0,0) is allotted to a source apparatus X connected to a xth HDMI input terminal of a sink apparatus (TV), and a physical address (x,y,0,0) is allotted to a source apparatus Y connected to a yth HDMI input terminal of the source apparatus X. In the configuration illustrated in FIG. 4, a physical address (1,0,0,0) is allotted to a source apparatus connected to the HDMI input terminal 11a, and a physical address (2,0,0,0) is allotted to a source apparatus connected to the HDMI input terminal 11b. Note that a physical address (0,0,0,0) is allotted to the TV, which TV is the sink apparatus.

(Functions of CPU of TV)

Figure 1:
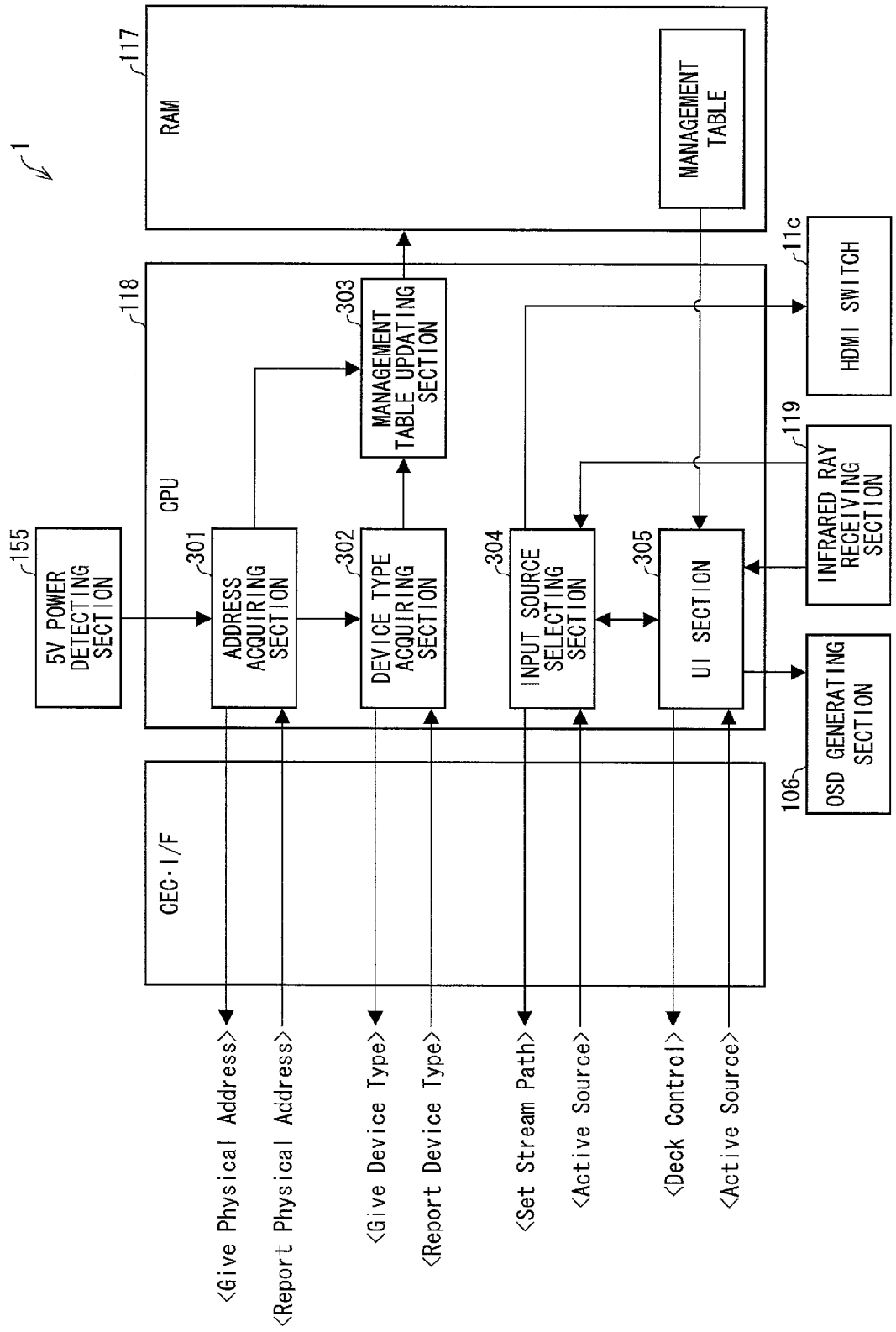
FIG. 1 is a functional block diagram illustrating functions of a TV (television receiver) according to an embodiment of the present invention.

The following description discusses functions of the CPU 118 provided in the TV 1 for realizing organically cooperative operation with the portable phone terminal 2, with reference to FIG. 1. FIG. 1 is a functional block diagram illustrating the functions of the CPU 118 provided in the TV 1. Note that the block diagram illustrated in FIG. 1 illustrates functions that are unique to the present invention among various functions possessed by the CPU 118, and it is needless to say that the CPU 118 may include functions not illustrated in FIG. 1.

As illustrated in FIG. 1, the CPU 118 of the TV 1 functions as an address acquiring section 301, a device type acquiring section 302, a management table updating section 303, an input source selecting section 304, and a UI section 305. The address acquiring section 301, the device type acquiring section 302, the management table updating section 303, the input source selecting section 304, and the UI section 305 operate while referring to a management table stored in the RAM 117. The management table stores, for each source apparatus connected to the TV 1 via HDMI, (i) a physical address and a logical address (first apparatus kind information) and (ii) a device type (second apparatus kind information) in such a manner that (i) and (ii) are associated to each other.

The "device type" here indicates information indicative of a kind of apparatus that the source apparatuses are classified into, which classification is different from the classification based on the logical address. In the present embodiment, information indicating whether the source apparatus is classified as a portable device or as a non-portable device serves as the "device type". A portable device is a source apparatus whose device type is set as "Mobile Phone" in the management table, and a non-portable device (stationary apparatus) is a source apparatus whose device type is set as not the "Mobile Phone".

The address acquiring section 301 is means for acquiring a physical address and a logical address of a source apparatus connected to the TV 1 via HDMI, from that source apparatus. When the address control section 301 receives a notification from the 5V power detection section 155 that a new source apparatus is connected to the TV 1 via HDMI, the address control section 301 acquires a physical address and a logical address of that source apparatus newly connected via HDMI. In the present embodiment, a <Give Physical Address> command, which is a standard CEC command, is used as a command for acquiring a physical address and a logical address. After the physical address and the logical address are acquired, the address acquiring section 301 notifies the management table updating section 303 of the acquired physical address and logical address, and notifies the device type acquiring section 302 that the address acquisition process is completed.

The device type acquiring section 302 is means for acquiring a device type of the source apparatus connected to the TV 1 via HDMI. After the device type acquiring section 302 receives from the address acquiring section 301 the notification that the address acquisition process is completed, the device type acquiring section 302 acquires a device type of the source apparatus that is connected to the TV 1 via HDMI. In the present embodiment, a <Give Device Type> command, which is a new vendor command disclosed in the present application, is used as a command for acquiring the device type. After the device type acquiring section 302 successfully acquires the device type, the device type acquiring section 302 notifies the management table updating section 303 of the acquired device type. If the device type acquiring section 302 runs out of time without acquiring a device type, the device type acquiring section 302 notifies to the management table updating section 303 that the device type is a "playback device".

The management table updating section 303 registers into a management table (i) the physical address and the logical address notified from the address acquiring section 301 and (ii) the device type notified from the device type acquiring section 302, in such a manner that (i) and (ii) are associated with each other. Note that in a case in which a physical address newly notified from the address acquiring section 301 is identical to a physical address already registered in the management table, the already-registered physical address, logical address, and device type are overwritten by the physical address and the logical address newly notified from the address acquiring section 301 and the device type newly notified from the device type acquiring section 302, respectively.

When a new source apparatus is connected to the TV 1 via HDMI, the management table stored in the RAM 117 is updated by the address acquiring section 301, the device type acquiring section 302, and the management table updating section 303. Details of a management table updating process realized by the address acquiring section 301, the device type acquiring section 302, and the management table updating section 303, are described later with reference to different drawings.

The input source selecting section 304 is means for selecting as an input source any one of the source apparatuses connected to the TV 1 via HDMI, in response to a request from the source apparatus connected to the TV 1 via HDMI, or in response to a request from a user operating the TV 1. The request from the source apparatus is supplied from the CEC•I/F 152 as a CEC command, and the request from the user is supplied via the infrared ray receiving section 119 as a remote controller signal. In the present embodiment, an <Active Source> command is assumed to serve as the CEC command for requesting the switching of the input sources.

After the input source selection section 304 receives the <Active Source> command from any one of the source apparatuses connected to the TV 1 via HDMI, the input source selecting section 304 switches the input source to the source apparatus designated by the physical address contained in the <Active Source> command, and transmits a <Set Stream Path> command to each of the source apparatuses connected to the TV 1. Note that the <Set Stream Path> command includes the physical address contained in the <Active Source> command, as an argument. In the embodiment, switching the input source to a source apparatus designated by the physical address (x,y,z,w) means to control the HDMI switch 11d to connect the xth HDMI input terminal to the HDMI receiver 100. Note that the <Set Stream Path> command is transmitted to instruct apparatuses intervening between the TV 1 and the source apparatus to switch the input source, so that a path is provided between the TV 1 and the source apparatus that has transmitted the <Active Source> command.

The UI section 305 is means for displaying an operation panel by OSD, which operation panel is a graphical user interface corresponding to the source apparatus selected as the input source. The UI section 304 can display an operation panel for a portable device by OSD, other than the operation panels for a playback device, recording device, a tuner device, and an audio device. The UI section 304 (1) acquires, from the input source selection section 303, a physical address of the source apparatus selected as the input source, (2) retrieves, from the management table stored in the RAM 117, a device type associated with the acquired physical address, and (3) displays by OSD an operation panel corresponding to the device type retrieved. For example, when the device type retrieved is "Mobile Phone", an operation panel for a portable device is displayed by OSD, and if the device type retrieved is "Player", the operation panel for a playback device is displayed by OSD. Note that the displaying of the operation panel by OSD by the UI section 305 means that the UI section 305 (i) retrieves data required for drawing an operation panel from the ROM 116 and (ii) supplies the retrieved data to the OSD generating section 106, in order to display the operation panel on the LCD 11 by OSD.

Each operation panel for a respective kind of apparatus has buttons corresponding to processes executable by source apparatuses classified into their respective kind of apparatus. For example, an operation panel for a playback device has buttons corresponding to processes such as "rewind", "play", and "fast forward". In comparison, an operation panel for a recording device includes a button corresponding to a process such as "recording". The user, by selecting a button corresponding to their desired process, can make the source apparatus selected as the input source execute their desired process.

When the user selects one of the buttons on the operation panel, the UI section 305 instructs to execute the process corresponding to the selected button to (a) an application running on the source apparatus selected as an input source, or (b) an application running on the TV 1. At this time, the UI section 305 identifies which button was selected by the user, for example, by referring to a remote controller signal provided from the infrared ray receiving section 119. Moreover, in the present embodiment, for example a <Deck Control> command (a standard CEC command) is used as a command for instructing the source apparatus, selected as the input source, to execute the process corresponding to the selected button. When a button corresponding to a process is selected, the UI section 305 transmits, to the source apparatus selected as the input source, a <Deck Control> command that includes a process ID of that process as an argument. This hence allows for instructing, to the source apparatus, execution of a process (e.g. "recording process") corresponding to the button selected by the user (e.g. "recording button").

Note that a command usable for instructing execution of the process corresponding to the selected button is not limited to the <Deck Control> command. For example, it is also possible to use standard CEC commands such as a <User Control Pressed> command or a <User Control Released> command. Alternatively, it is also possible to use a <Remote Button Down> command and <Remote Button Up> command, which are new vendor commands. The TV 1, at a time in which a button corresponding to a particular process is selected, transmits a <User Control Pressed> command or a <Remote Button Down> command in which a process ID corresponding to that particular process serves as an argument. When the selection of that button is released, the TV 1 transmits a <User Control Released> command or a <Remote Button Up> command, in which that process ID serves as an argument. On the other hand, at a time in which the source apparatus receives the <User Control Pressed> command or the <Remote Button Down> command, which has the particular process ID serve as its argument, the source apparatus starts the execution of a process designated by that process ID. Meanwhile, at a time in which the source apparatus receives the <User Control Released> command or the <Remote Button Up> command, each of which having that particular process ID serve as its argument, the process designated by that process ID terminates. Namely, the portable phone terminal 2 continuously executes the process designated by the process ID that is included in the command as an argument in the <User Control Pressed> command or the <Remote Button Down> command, from when the <User Control Pressed> command or <Remote Button Down> command is received to when the <User Control Released> command or the <Remote Button Up> command is received. These commands are effective when the TV 1 instructs the portable phone terminal 2 to execute a process to be executed during a period in which the button is selected (e.g. fast forwarding process in a playback device), and the <Deck Control> command is effective when the TV 1 instructs the portable phone terminal 2 to execute a process to be executed at a moment that the button is selected (e.g. "stop" process in the playback device).

Figure 7:
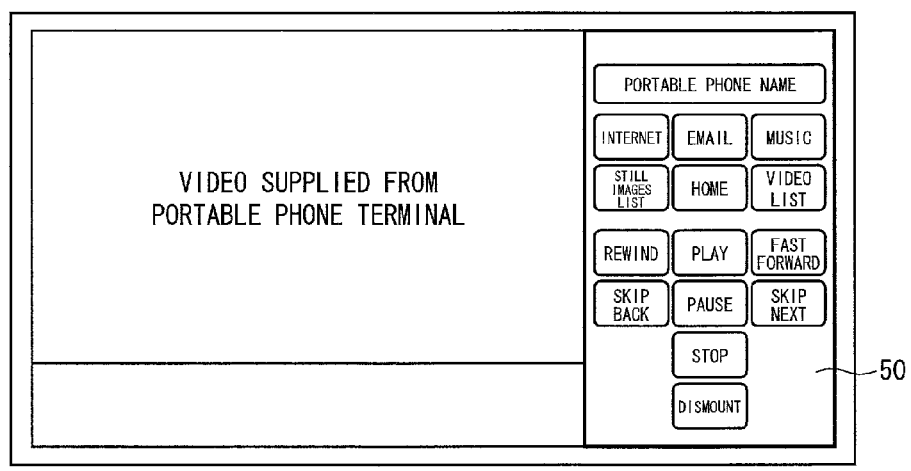
FIG. 7 is a view illustrating a configuration of an operation panel displayed by OSD on the TV illustrated in FIG. 2.

FIG. 7 is a view illustrating an example of a configuration of a display screen (screen displayed on a LCD 110 of the TV 1) including the operation panel 50 for portable devices. A video supplied from the source apparatus selected as the input source is displayed by scaling, and an operation panel 50 prepared by the UI section 305 is displayed by OSD. Note that display by scaling represents a display mode that displays a video shrunk in size while maintaining an original aspect ratio of the video to be displayed. In a case in which the portable phone terminal 2 is selected as the source apparatus, a video supplied from the portable phone terminal is displayed by scaling, as illustrated in FIG. 7.

The operation panel 50 for the portable device has buttons not provided in the operation panel for the playback device, such as "Internet" and "e-mail", other than the buttons common to the operation panel of a playback device, such as "rewind", "play", and "fast forward". For example, when the "e-mail" button is selected, the UI section 305 transmits, to the portable phone terminal 2, a <Remote Button Down> command that includes, as its argument, a process ID of a starting process of the e-mail client. This causes the e-mail client to be booted on the portable phone terminal 2.

When the portable phone terminal 2 is selected as the input source, the UI section 305 displays by OSD various operation panels for operating the portable phone terminal 2.

Figure 8:
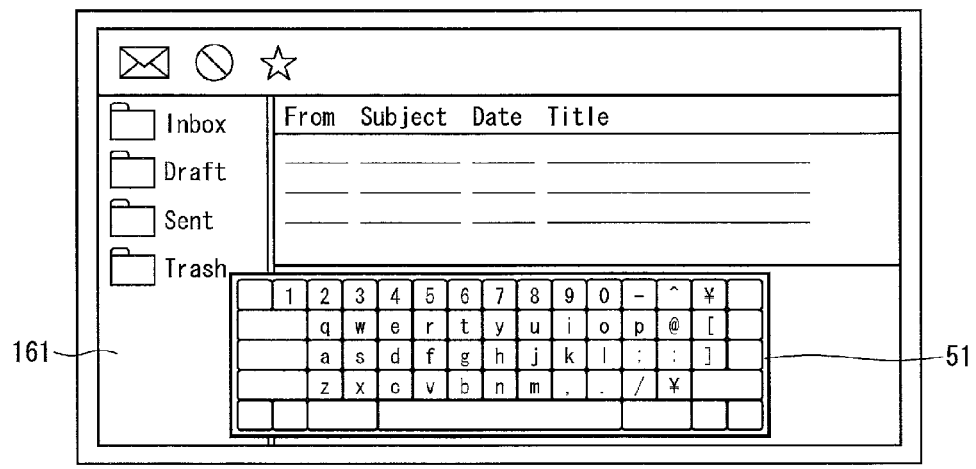
FIG. 8 is a view illustrating a configuration of a software keyboard displayed by OSD on the TV illustrated in FIG. 2.

FIG. 8 is a view illustrating an example of a configuration of a display screen (screen displayed on the LCD 110 of the TV 1) including a software keyboard 51. The software keyboard 51 displayed by OSD is displayed by the UI section 305 on a GUI 61 of an e-mail client provided from the portable phone terminal 2. Note that the portable phone terminal 2 is selected as an input source. Every time a key on the software keyboard 51 is selected by the user, the UI section 305 transmits to the portable phone terminal 2 a <Remote Button Down> command that includes a process ID corresponding to the selected key. By employing such a configuration, it is possible to operate the e-mail client via a remote controller of the TV 1, such as editing a sentence for transmission using the software keyboard 51.

Although the present embodiment exemplifies an e-mail client as an application operated on the TV 1, the application is not limited to this. For example, other communication applications may be subject to operation, such as a web browser or like application.

Generally, the TV 1 and the portable phone terminal 2 are different in their accessible contents and applicable communication mediums. Hence, by enabling operation of the communication application of the portable phone terminal 2 from the TV 1, and by having the TV 1 and the portable phone terminal 2 be organically cooperative with each other, it is possible to access contents that are not accessible from the TV 1 (contents only accessible from the portable phone terminal 2), from the TV 1. This further allows for using communication mediums that could not be used for the TV 1 (communication mediums only usable with the portable phone terminal 2), for the TV 1. Furthermore, by using the communication function of the portable phone terminal 2 via the TV 1 and using the communication function of the TV 1 via the portable phone terminal 2, it is possible to complement or expand the communication functions of both of the TV 1 and the portable phone terminal 2.

FIG. 17 illustrates an example of such a system including a TV 1 and a portable phone terminal 2, which are connected via HDMI. In the system illustrated in FIG. 17, the TV 1 is connected to an e-mail server MS, a web server WS, and a VOD server VS, via the Internet IN. A gateway or the like (not illustrated) provided by an ISP (Internet Service Provider) may intervene between the TV 1 and the Internet IN. On the other hand, the portable phone terminal 2 is connected to a carrier server CS via a base station BS and a packet network PN. In the example, the base station BS, the packet network PN, and the carrier server CS are provided by a portable phone carrier (telecommunications carrier).

The carrier server CS has an e-mail server function, and is used for sending and receiving e-mail between portable phone terminals connected to the packet network PN. Moreover, the carrier server CS is connected to the e-mail server MS via the Internet IN. The carrier server CS forwards e-mail (e-mail whose destination is a client under management of the e-mail server MS) sent from the portable phone terminal 2 to the e-mail server MS, and forwards e-mail received from the e-mail server MS (e-mail whose destination is the portable phone terminal 2) to the portable phone terminal 2.

Furthermore, the carrier server CS has a content distribution function. The content distribution function is utilized to distribute unique content (content provided uniquely by the portable phone carrier) to portable phone terminals connected to the packet network PN. Moreover, the carrier server CS is connected to the web server WS and the VOD server VS via the Internet IN. The carrier server CS forwards a content request sent from the portable phone terminal 2 to the web server WS or the VOD server, and forwards the content received from the web server WS or the VOD server VS to the portable phone terminal 2.

In the system illustrated in FIG. 17, the web browser running on the TV 1 cannot receive the unique content distributed from the carrier server CS. However, the TV 1 can transmit, to the portable phone terminal 2, a CEC command that instructs to access the unique content, via the HDMI cable. Accordingly, the web browser running on the portable phone terminal 2 that receives this CEC command obtains the unique content, and supplies a video signal representing the obtained unique contents to the TV 1 via the HDMI cable. The TV 1, by referring to this video signal, can display the unique content on the LCD 110. As such, by providing the TV 1a function of controlling a communication application that runs on the portable phone terminal 2, it is possible to display a content only accessible from the portable phone terminal 2, on the LCD 110.

Figure 9:
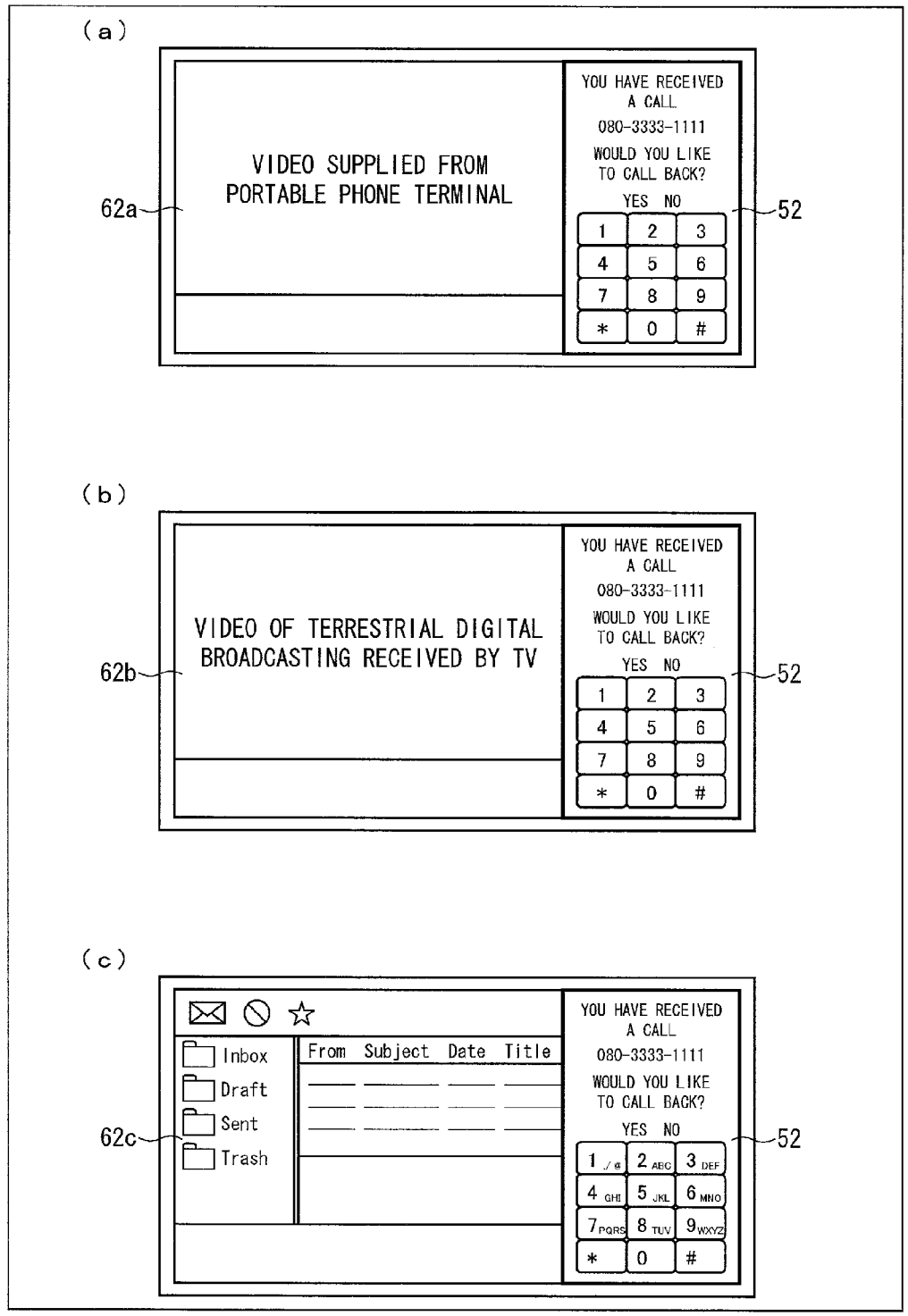
FIG. 9 is a view illustrating an operation panel for telephonic communication, displayed by OSD on the TV illustrated in FIG. 2.

FIG. 9 is a view illustrating an example of a configuration of a display screen (screen displayed on the LCD 110 of the TV 1) including an operation panel 52 for telephonic communication. FIG. 9(a) is an example of how the display screen is displayed in a case in which the portable phone terminal 2 is selected as the input source and while a content is played back on the portable phone terminal 2. In this example, a video 62a supplied from the portable phone terminal 2 is displayed by scaling, and an operation panel 52 for telephonic communication generated in response to an instruction from the UI section 305 is displayed by OSD. FIG. 9(b) is an example of how the display screen is displayed in a case in which the TV 1 is selected as the input source. In this example, a video 62b of terrestrial digital broadcasting received by the TV 1 is displayed on the display screen, and the operation panel 52 for telephonic communication generated in response to an instruction from the UI section 305 is displayed by OSD. Every time a numerical key is selected on the operation panel 52 by the user, the UI section 305 transmits to the portable phone terminal 2 a <User Control Pressed> command and a <User Control Released> command, each of which includes a process ID corresponding to the selected numerical key. The portable phone terminal 2 identifies a phone number entered by the user from a set of arguments of the received <User Control Pressed> command and the <User Control Released> command, and executes a calling process for calling the identified telephone number. By employing such a configuration, it is possible to carry out a telephonic conversation using the portable phone terminal 2 by operating the remote controller of the TV 1, while the user enjoys the content played on the portable phone terminal 2 or TV 1. Note that it is possible to employ a dual-screen configuration (three screens including the operation panel), in which contents played on the portable phone terminal 2 and contents played on the television 1 are displayed at the same time.

FIG. 9(c) is an example of how the display screen is displayed in a case in which the portable phone terminal 2 is selected as the input source, and while an e-mail client is executed on the portable phone terminal 2. In the example, a UI screen 62c of the e-mail client supplied from the portable phone terminal 2 is displayed by scaling, and the operation panel 52 for telephonic communication generated in response to an instruction from the UI section 305 is displayed by OSD. By employing such a configuration, it is possible to edit an e-mail sentence with a same feeling as directly operating the portable phone terminal 2, for example entering "A" "I" "U" "E" "O" by pressing the numerical key "1" for a respective multiple number of times.

The operation panel 52 for telephonic communication further has a call notification function that notifies an incoming call received by the portable phone terminal 2. This call notification function can be realized by, for example, (1) the portable phone terminal 2 notifying the TV 1 of the phone number of the incoming call via a CEC command, and (2) the UI section 305 displaying by OSD, on the operation panel 52 for telephonic communication, the notified phone number of the incoming call. Moreover, in a case in which the TV 1 itself has the function for telephonic communication, a feature can be added in which the phone number of the incoming call notified from the portable phone terminal 2 can be called back, by use of the function for telephonic communication in the TV 1. This allows for calling back with use of communication lines that are cheaper in charges, such as IP phones and optical phones, as compared to charges of a portable phone. More typically, when a particular user operation is entered to the operation panel, a process associated with that user operation can be executed by use of a function provided in the TV 1.

As described above, the TV 1 has a control function which, by issuing a CEC command to the portable phone terminal 2 connected via HDMI, (i) selects a communication application to be run on the portable phone terminal 2 or (ii) controls a communication application that is running on the portable phone terminal 2. It is as described above, that (i) it is possible to select on the TV 1 whether to have the e-mail client to run or the web browser to run on the portable phone terminal 2, and (ii) it is possible to control the e-mail client, the web browser, and the communication application that runs on the portable phone terminal 2, via the TV 1. These functions are realized by the UI section 305 of the TV 1.

Furthermore, the TV 1 has a function that displays an operation panel on the LCD 110 for making a user select a command to be transmitted to the portable phone terminal 2. FIG. 7 illustrates one example of the configuration of the operation panel for selecting a communication application to be run on the portable phone terminal 2. Moreover, FIG. 8 and FIG. 9(c) illustrate examples of an operation panel for controlling an e-mail client that runs on the portable phone terminal 2. Moreover, FIG. 9(a) and FIG. 9(b) illustrate examples of an operation panel for controlling the telephonic communication application that runs on the portable phone terminal. These functions are realized by the UI section 305 and the OSD display section, provided in the TV 1. Note that, by having the operation panel be provided with a numeric keypad aligned as with a telephone, as illustrated in FIGS. 9(a) to 9(c), it is possible to realize with the operation panel any operation that can be carried out with use of the numeric keypad of the portable phone terminal 2.

Furthermore, other than the function for displaying on the LCD 110 a video in response to a video signal received via a tuner (any one of a terrestrial digital broadcasting tuner 103, an IP broadcasting tuner 104, and a satellite broadcasting tuner 105), the TV 1 has a function for displaying, on the LCD 110, a GUI (Graphical User Interface) generated by a communication application (e-mail client in the example illustrated in FIG. 8) that runs on the portable phone terminal 2, in response to a video signal provided from the portable phone terminal 2 via HDMI (see FIG. 8). In this case, the operation panel as described above is either displayed superimposed on the GUI generated by the communication application running on the portable phone terminal 2, as illustrated in FIG. 8, or is displayed superimposed on a video received via a tuner, as illustrated in FIG. 9(b).

The present embodiment discussed a configuration in which a device type is notified to the TV 1 from the portable phone terminal 2 connected via HDMI, and the television 1 executes a process depending on whether or not the source apparatus is a portable device. Note however, that the present invention is not limited to this. Namely, the present invention can also employ a configuration in which individual information of the portable phone terminal 2 or personal information of the user of the portable phone terminal 2 is notified to the TV 1 from the portable phone terminal 2 connected via HDMI, and the TV 1 executes a process depending on (i) what portable phone terminal the portable phone terminal connected via HDMI is or (ii) who the user of the portable phone terminal 2 is.

For example, a telephone number of the portable phone terminal 2 can be used as the individual information of the portable phone terminal 2 to be notified to the TV 1. However, information applicable as the individual information is not limited to this, and can be any information as long as it is information that can be used for distinguishing the portable phone terminal 2 from other portable phone terminals. For example, it is possible to use other individual information retrieved from a USIM card 206, as the ID. It is possible to use, as the personal information notified from the portable phone terminal 2 to the TV 1, a face (face image itself, or features extracted from a face image) of a user of the portable phone terminal 2, which face is image captured by a camera 223. However, the information applicable as the personal information is not limited to this, and can be any information as long as it is possible to use the image for estimating the user of the portable phone terminal 2. For example, in a case in which the portable phone terminal 2 is installed with a fingerprint sensor, it is possible to use a fingerprint (fingerprint image itself or features extracted from the fingerprint image) of the user as personal information, which fingerprint is detected with use of the fingerprint sensor. Furthermore, as the personal information, the face and the fingerprint can be employed in combination. Alternatively, whether (i) the face is employed as the personal information, (ii) the fingerprint is employed as the personal information, or (iii) the combination of the face and fingerprint is employed as the personal information, can be switched depending on a level of verification. Moreover, in a case in which an age of the user is registered in the portable phone terminal 2, it is possible to have the age of the user serve as the personal information.

Processes carried out in accordance with the individual information or personal information obtained from the portable phone terminal 2 connected via HDMI include processes such as image quality adjustment by the video processing circuit 108, sound quality adjustment by the audio processing circuit 112, and GUI adjustment in the OSD generating section 106. This allows for carrying out image quality adjustment and sound quality adjustment as desired by the user, for every portable phone terminal. For example, in a case in which a portable phone terminal of a user A is connected to the TV 1 via HDMI, a video having a high contrast is displayed, and in a case in which a portable phone terminal of a user B is connected via HDMI to the TV 1, a video having a low contrast is displayed. Examples of the GUI adjustment include a case in which a menu is displayed in Hiragana or in Katakana in a case in which the user of the portable phone terminal 2 is a child, and in a case in which the user of the portable phone terminal 2 is an elderly person, the font size of the menu is displayed largely.

Moreover, it is possible to use the individual information or personal information acquired from the portable phone terminal 2 connected via HDMI, for personal verification in receiving various web services provided to the TV 1. For example, it is possible to configure a system including: (1) a portable phone terminal 2 including a HDMI transmitter 200 (transmitting means) for transmitting, to the TV 1, individual information retrieved from the USIM card 206 (storage section); (2) a TV 1 including (i) a HDMI receiver 100 (receiving means) that (a) receives the individual information transmitted from the portable phone terminal 2 and (b) causes the RAM 117 (storage section) to store the received individual information, and (ii) Ethernet I/F 115 (providing means) for (a) retrieving the individual information from the RAM 117 (storage section) and (b) providing the retrieved individual information to a server; and (3) a server including user identification means for identifying a user of the TV 1 based on the individual information provided from the TV 1. By configuring a system as described above, it is possible for the server to select or restrict the service provided to the TV 1, in accordance with the user (or alternatively, information related to that user) of the TV 1. For example, the server can select or restrict contents distributed to a television in accordance with the user (or alternatively, information related to the user) of the TV 1.

As described above, the TV 1 has a function for acquiring, from the portable phone terminal 2 connected via HDMI, (i) individual information for distinguishing the portable phone terminal 2 from other portable devices, or (ii) personal information for distinguishing the user of the portable phone terminal 2 from other users. This allows for changing the video displayed on the display screen in accordance with the individual information or personal information. The image quality adjustment and GUI adjustment carried out in accordance with the personal information or individual information described above, are examples of the expression "changing the video" in this embodiment. Moreover, even in a case of employing a configuration in which the TV 1 receives (acquires) distribution of contents selected in accordance with the individual information or personal information, the detail of a video displayed in accordance with the individual information or personal information changes.

The present embodiment describes a configuration in which instructions to execute a process is provided to the source apparatus via the operation panel. However, the configuration is not limited to this. Namely, the instruction to execute a process to the source apparatus can be provided without using the operation panel. For example, it is possible to employ a configuration in which, for example, when a key on a remote controller for operating the television is pressed, the TV 1 notifies the source apparatus of a key ID of the pressed key. As the command used for the TV 1 to notify the source apparatus of the key ID of the pressed key, it is possible to use a <User Control Pressed> command and a <User Control Released> command, each of which is a standard CEC command. The TV 1 transmits the <User Control Pressed> command at a time in which the key is pressed down, and the TV 1 transmits the <User Control Released> command at a time in which the key is released. On the other hand, the source apparatus starts execution of a process at a time in which the <User Control Pressed> command is received, and the source apparatus terminates the execution of the process at a time in which the <User Control Released> command is received. At this time, by having the key ID of the pressed key serve as an argument of the command, it is possible to notify the source apparatus of which key was pressed, in addition to notifying a timing that the key was pressed and the timing that the key was released. By employing such a configuration, the user can operate the portable phone terminal 2 as though the remote controller for operating the TV 1 is a part of the portable phone terminal 2.

(Details of Management Table Updating Process)

Figure 10:
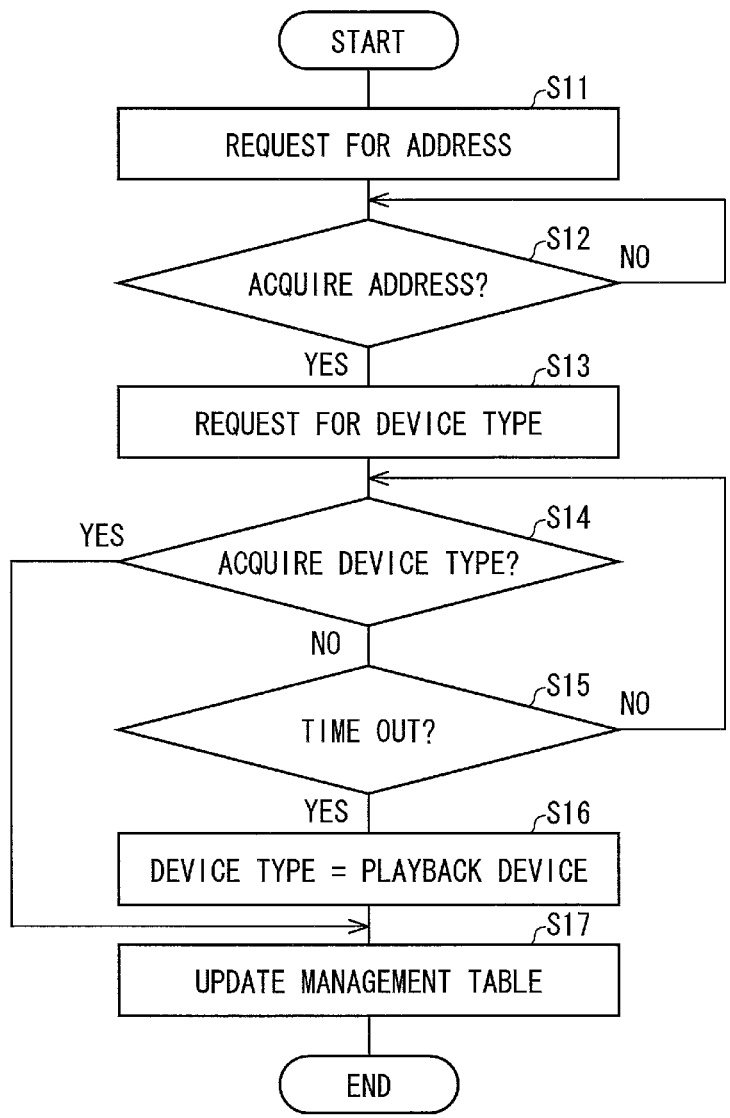
FIG. 10 is a flowchart showing procedures of a management table updating process carried out in the TV illustrated in FIG. 2.

The following description will discuss a management table updating process that is executed by the TV 1 (address acquiring section 301, device type acquiring section 302, management table updating section 303), at a time in which a connection between the TV 1 and the source apparatus is established via HDMI, with reference to FIG. 10. FIG. 10 is a flowchart illustrating procedures of a management table updating process executed by the TV 1. Described below are each of steps included in the flowchart illustrated in FIG. 10, in the order of execution.

Step S11: When the address acquiring section 301 receives a notification from the 5V power detecting section 155 that the connection with the source apparatus is established, a <Give Physical Address> command is transmitted to the source apparatus.

Step S12: The address acquiring section 301 waits for a response from the source apparatus, with respect to the <Give Physical Address> command. When the address acquiring section 301 receives a <Report Physical Address> command, the address acquiring section 301 notifies the management table updating section 303 a physical address and a logical address (apparatus kind information) that are included in the <Report Physical Address> command as arguments of the command, and notifies the device type acquiring section 302 that the address acquisition process is completed.

Step S13: After the device type acquiring section 302 receives the notification that the address acquisition process is completed, the device type acquiring section 302 transmits a <Give Device Type> command to the source apparatus.

Steps S14, S15: The device type acquiring section 302 waits for a response from the source apparatus, with respect to the <Give Device Type> command, until "time out" (Yes in step S15). In this example, "time out" means that a predetermined time is elapsed (e.g., 1 second) after the <Give Device Type> command has been transmitted. In a case in which a <Report Device Type> command is received before the "time out", the device type acquiring section 302 notifies the management table updating section 303 that a device type of the source apparatus is "Mobile Phone". The device type in the present embodiment is information indicative of whether or not an initiator of the <Report Device Type> is a portable phone terminal. If the initiator of the <Report Device Type> is the portable phone terminal, a value "Mobile Phone" is acquired.

Step S16: If the predetermined time is elapsed before the TV 1 receives the <Report Device Type> command, the device type acquiring section 302 notifies, to the management table updating section 303, a kind of apparatus that corresponds to the logical address acquired in step S12 (FIG. 10 exemplifies a case in which the logical address acquired in step S12 represent the playback devices 1 to 3).

Step S17: The management table updating section 303 records, to the management table, (i) the physical address and the logical address, each notified from the address acquiring section 301 in step S12, and (ii) the device type notified by the device type acquiring section 302 in step S14 or step S16, in such a manner that the physical address and the logical address are associated with the device type.

Figure 11:
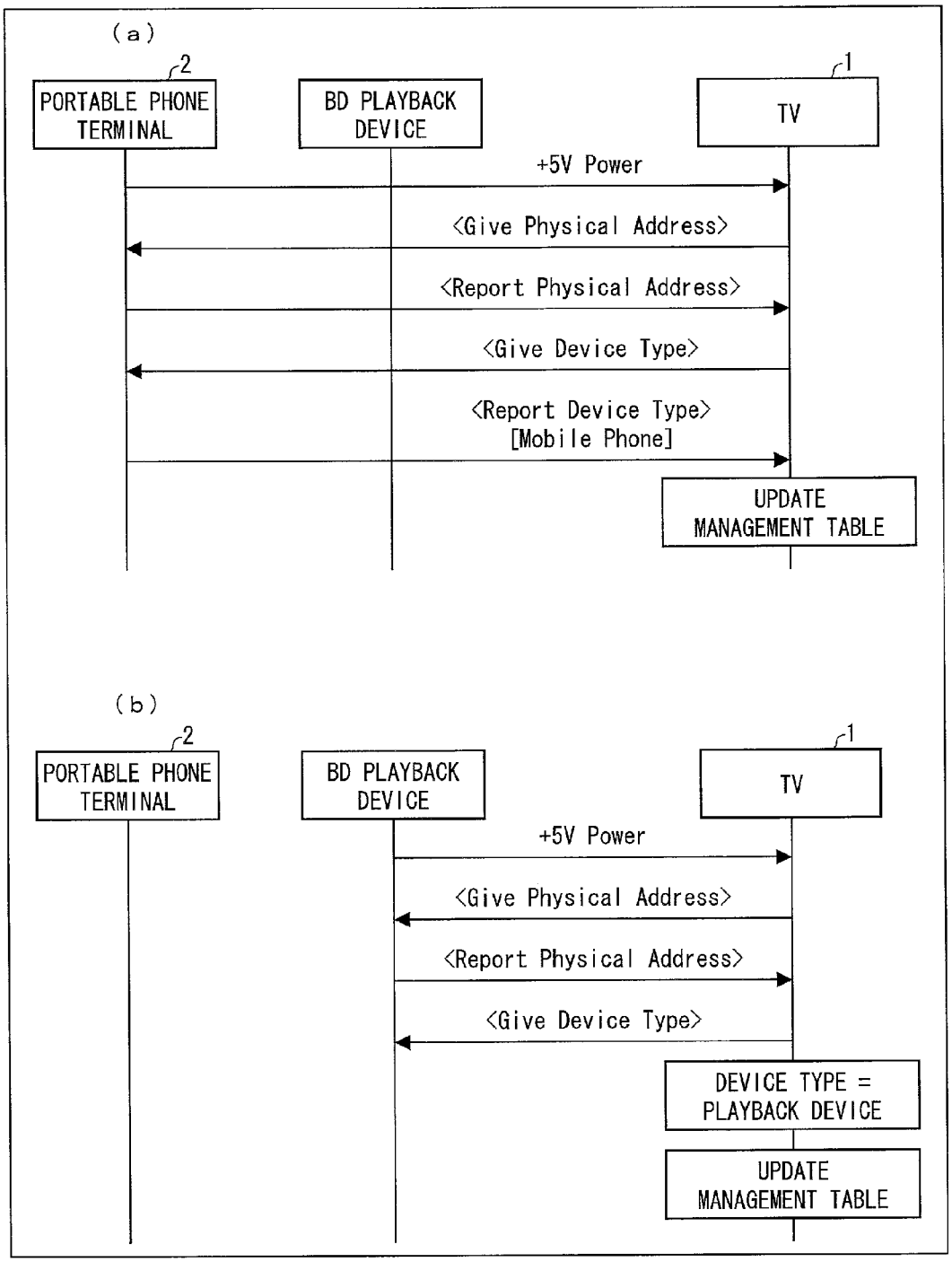
FIG. 11 is a sequential view illustrating an example of executing a management table updating process in the TV illustrated in FIG. 2; (a) is a case in which a portable phone terminal is connected to the TV via HDMI, and (b) illustrates a case in which a BD playback device is connected to the TV via HDMI.

FIG. 11(a) is an execution example of the management table updating process, and is a sequential view showing an execution example in a case in which a connection via HDMI is established between a TV and a portable phone terminal. FIG. 12(a) is a view showing what is stored in the management table after the management table updating process is executed. In the case in which the connection via HDMI is established between the TV and the portable phone terminal, a <Report Device Type> including "Mobile Phone" as an argument is returned from the portable phone terminal in response to the <Give Device Type> command, as illustrated in FIG. 11(a). Hence, the management table updating section 303 registers, to the management table, the physical address and the logical address of the portable phone terminal with which connection is established via HDMI, in such a manner that the physical and the logical addresses are associated with the device type "Mobile Phone", as illustrated in FIG. 12(a).

FIG. 11(b) is another execution example of the management table updating process, and is a sequential view illustrating an execution example of a case in which a connection via HDMI is established between the TV and a BD playback device. FIG. 12(b) is a view showing stored details in a management table, after the management table updating process has been executed. In the case in which the connection via HDMI is established between the TV and the BD playback device, the BD playback device returns no <Report Device Type> in response to the <Give Device Type> command, as illustrated in FIG. 11(b). Hence, the management table updating section 303 registers, to the management table, the physical address and the logical address of the BD playback device with which the connection via HDMI is established, in such a manner that the physical address and the logical address are not associated with the device type "Mobile Phone" but are associated with a logical address "playback device", as illustrated in FIG. 12(b).

Note that the management table updating process is not limited to the example shown in FIG. 10. For example, the management table updating process can be modified as shown in FIG. 13 or FIG. 14.

Figure 13:
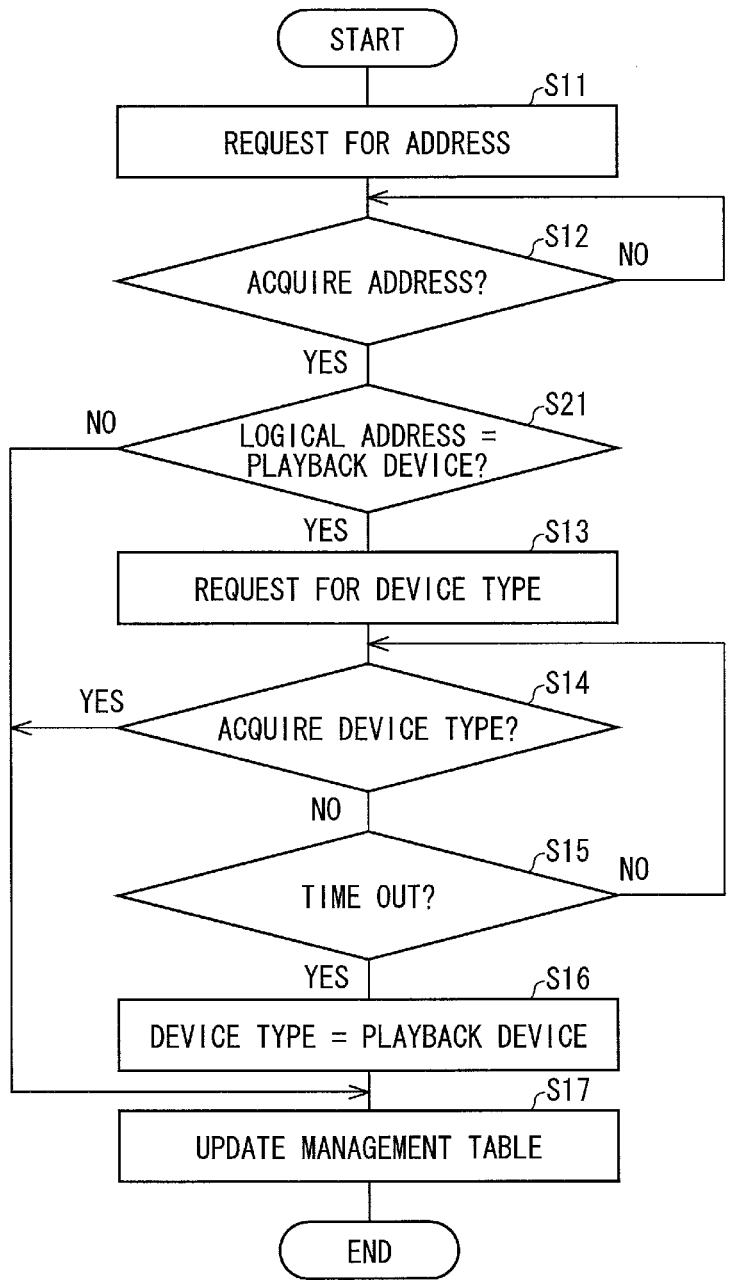
FIG. 13 is a view showing a modification of the management table updating process shown in FIG. 10.

FIG. 13 is a flowchart showing a first modification of the management table updating process. The management table updating process illustrated in FIG. 13 (1) acquires a physical address and a logical address of the source apparatus (step S11-12), (2) determines whether or not the acquired logical address represents a "playback device" (step S21), and (3) acquires a device type of the source apparatus in a case in which the acquired logical address represents the "playback device" (step S13-15). In a case in which the logical address of a portable phone terminal is made to be representing the "playback device", it is possible to omit unnecessary issuing of the <Give Device Type> to a source apparatus other than the "playback device"; the portable phone terminal can only be the "playback device".

Figure 14:
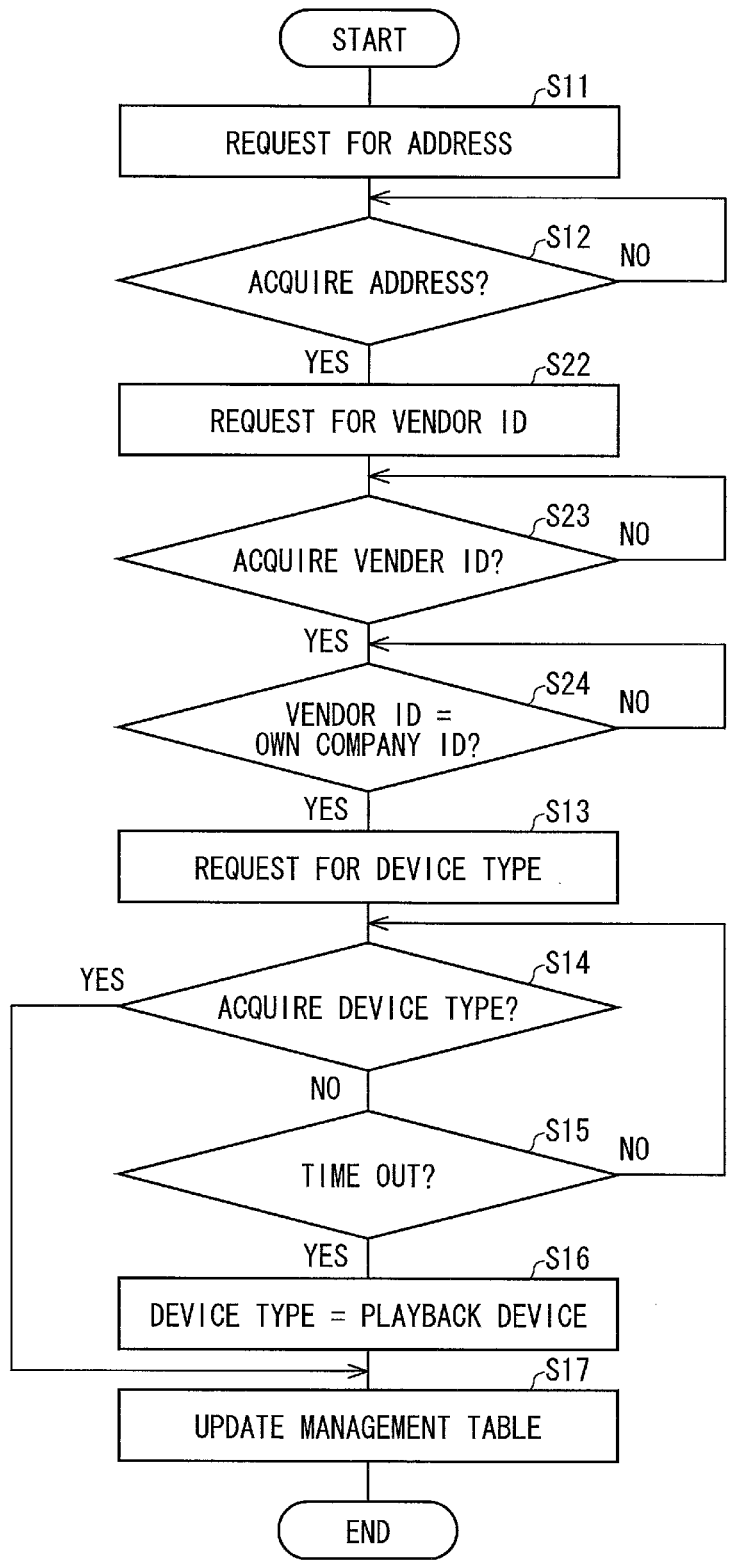
FIG. 14 is a view showing another modification of the management table updating process shown in FIG. 10.

FIG. 14 is a flowchart illustrating a second modification of the management table updating process. The management table updating process illustrated in FIG. 14 (1) acquires a physical address and a logical address of the source apparatus (S11-12), (2) acquires a vendor ID of the source apparatus with use of a <Give Vender ID> command and a <Report Vender ID> command (step S22-23), (3) determines whether or not the vendor ID is identical to a particular vendor ID (step S24), and (4) acquires a device type of the source apparatus just when the acquired vendor ID is identical to a predetermined particular vendor ID (step S13-15). By comparing in step S24 the vendor ID acquired in step S23 and the vendor ID of the maker supporting the <Give Device Type> command, it is possible to omit unnecessary issuing of a <Give Device Type> command to a source apparatus of a maker that does not support the <Give Device Type>.

(Details of Operation Panel Display Process)

Figure 15:
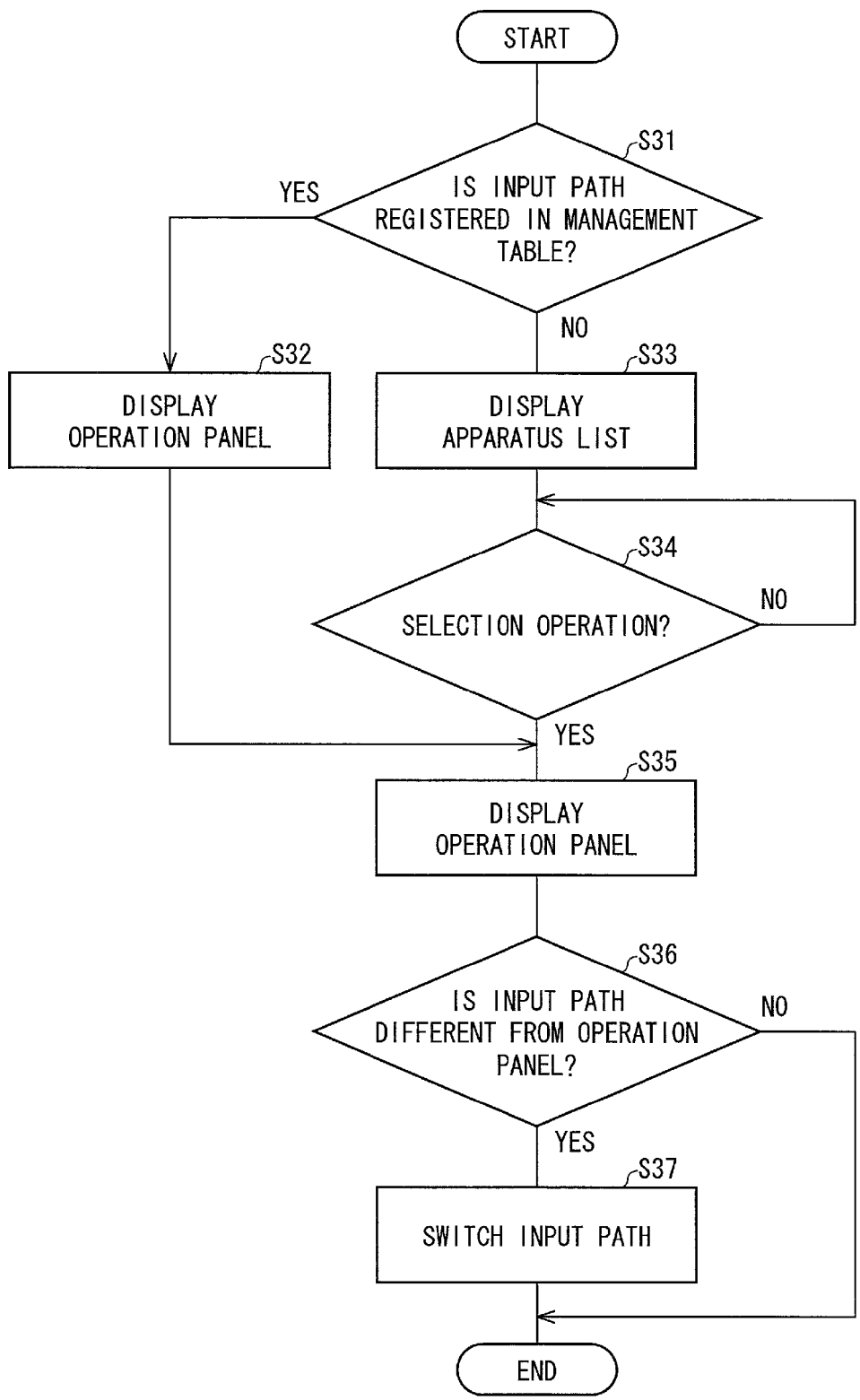
FIG. 15 is a flowchart showing procedures of an operation panel display process carried out in the TV illustrated in FIG. 2.

The following describes an operation panel display process executed by the TV 1 (UI section 305), with reference to FIG. 15. FIG. 15 is a flowchart showing a procedure of the operation panel display process. Described below are each of steps included in the flowchart of FIG. 15.

The operation panel display process shown in FIG. 5 is executed by being triggered (i) in response to a request from the user to display the operation panel or (ii) by detecting that the source apparatus has started to play back a content. The TV 1 (UI section 305) can be triggered to start the operation panel display process by detecting a request from the user, upon reference to a remote control signal supplied from the infrared ray receiving section 119. Moreover, TV 1 (UI section 305) can be triggered to carry out the operation panel display process by detecting that the source apparatus has started to play back a content, as a result of detecting that an <Active Source> has been received from the source apparatus.

Step S31: The UI section 305 acquires, from the input source selecting section 304, a physical address (hereinafter, called "input path") of a source apparatus selected as the input source. The UI section 305 then determines whether or not the acquired input path is registered in the management table. In a case in which the input path is registered in the management table, the UI section 305 displays the operation panel corresponding to the input path, by OSD.

Step S32: In a case in which the acquired input path is registered in the management table (Yes in step S31), the UI section 305 refers to a logical address associated with the input path in the management table, and displays an operation panel corresponding to the kind of apparatus of the source apparatus selected as the input source, by OSD. However, in a case in which the device type "Mobile Phone" is associated with the input path in the management table, an operation panel for a portable device is displayed by OSD.

Step S33: In a case in which the acquired input path is not registered in the management table (No in step S31), the UI section 305 displays an apparatus list, by OSD. In the example, an apparatus list is a list of the kinds of apparatuses of the source apparatuses that are registered in the management table. In a case in which names of the source apparatuses are registered in the management table in addition to the kinds of apparatuses (logical address) of the source apparatuses, a list that lists the names of the apparatuses of the source apparatuses can be displayed as the apparatus list, by OSD.

Step S34: After displaying the apparatus list by OSD, the UI section 305 waits for the user to select any one of the source apparatuses listed in the apparatus list. Hereinafter, a source apparatus selected from the apparatus list by the user is referred to as selected apparatus.

Step S35: After any one of the source apparatuses listed in the apparatus list is selected by the user (Yes in step S34), the UI section 305 displays the operation panel corresponding to the kind of apparatus of the selected apparatus, by OSD. However, in the case in which the device type "Mobile Phone" is associated with the selected apparatus in the management table, the operation panel for a portable device is displayed by OSD.

Step S36: The UI section 305 determines whether or not the physical address, associated with the selected apparatus in the management table, corresponds to the input path.

Step S37: In a case in which the physical address associated with the selected apparatus in the management table is not identical to the input path (Yes in step S36), the UI section 305 instructs the input source selecting section 304 to switch the input path. The input source selecting section 304 switches the source selected as the input source, to the selected apparatus.

Another more simple operation panel display method is a method in which a display of the operation panel for a portable phone terminal is started by being triggered in response to an establishment of a connection between the TV 1 and the portable phone terminal via HDMI (the operation panel is made to appear on the screen), and the display of the operation panel for the portable phone terminal is terminated by being triggered in response to a disconnection of the connection between the TV 1 and the portable phone terminal via HDMI (the operation panel is deleted from the screen). In a case in which three portable phone terminals 2a to 2c are connected with HDMI, as illustrated in FIG. 2(*b*), it is possible to employ (i) a configuration in which three operation panels corresponding to respective portable phone terminals are displayed at the same time, or (ii) a configuration in which just the operation panel corresponding to the portable phone terminal connected with the TV 1 via HDMI most recently, is displayed on the TV 1.

(Relay Viewing of One-Segment Content)

Note that it is possible to employ a configuration of the TV 1 in which, when the TV 1 is connected via HDMI to a portable phone terminal 2 capable of receiving one-segment broadcasting, the TV 1 instructs the portable phone terminal 2, with use of a CEC command, to start playing back a one-segment broadcasting content, so that a one-segment broadcasting content can be outputted from the TV 1 just by connecting the TV 1 with the portable phone terminal 2. This makes it possible for a user that comes home while viewing a one-segment broadcasting content on the portable phone terminal 2 to immediately view a continuation of that one-segment broadcasting content on the TV 1, just by connecting the portable phone terminal 2 to the TV 1 at home.

(Use as Terrestrial Digital Broadcasting Tuner)

Moreover, the TV 1 can have a function as described below, to prepare for the termination of the analog broadcasting waves, to be executed in 2011. Namely, in a case in which the TV 1 detects the termination of the analog broadcasting waves (e.g., when no video/audio signal is outputted from the analog broadcasting tuner), the TV 1 can display the one-segment broadcasting content that was played back on the portable phone terminal 2, by instructing the portable phone terminal 2 connected to the TV 1 via HDMI to start a receiving process of the one-segment broadcasting. This makes it possible for a user using a television only provided with an analog broadcasting tuner, to view a television program received via a one-segment broadcasting tuner of the portable phone terminal 2 just by connecting the TV 1 with the portable phone terminal 2 via HDMI, even after the analog broadcasting waves have been terminated in their distribution. Note that in a case in which the portable phone terminal 2 becomes capable of being installed with an antenna for receiving broadcasting content other than the one-segment broadcasting, the receivable broadcasting will not be limited to the one-segment broadcasting.

Moreover, it is possible to employ a configuration of the TV 1 in which the TV 1 displays, by OSD, an indicator showing a remaining battery level of the portable phone terminal 2 connected via HDMI, by acquiring, from the portable phone terminal 2, remaining battery level information indicative of the remaining battery level, and displaying the indicator based on this remaining battery level information. This makes it possible for the user to clearly see the remaining battery level of the portable phone terminal 2 connected to the TV 1 via HDMI, on a large screen of the TV 1. Note that it is not limited in particular of a position on the screen on which the indicator is displayed. However, it is possible to provide the indicator, for example, near the operation panel for the portable phone terminal or near the operational buttons in the operation panel for the portable phone terminal. Moreover, it is not limited in particular as to a timing for displaying the indicator. However, the timing can be, for example, a point in time at which the connection between the TV 1 and the portable phone terminal 2 is established (a point in time at which the portable phone terminal 2 is placed on the charging stand).

(Use of TV Communication Function)

The TV 1 includes a CPU 118. Hence, the TV 1 is capable of executing communication applications such as an e-mail client and a web browser, as with the portable phone terminal 2. The following description briefly describes how a communication application running on the portable phone terminal 2 cooperates with the communication application running on the TV 1, with reference to FIG. 16.

Figure 16:
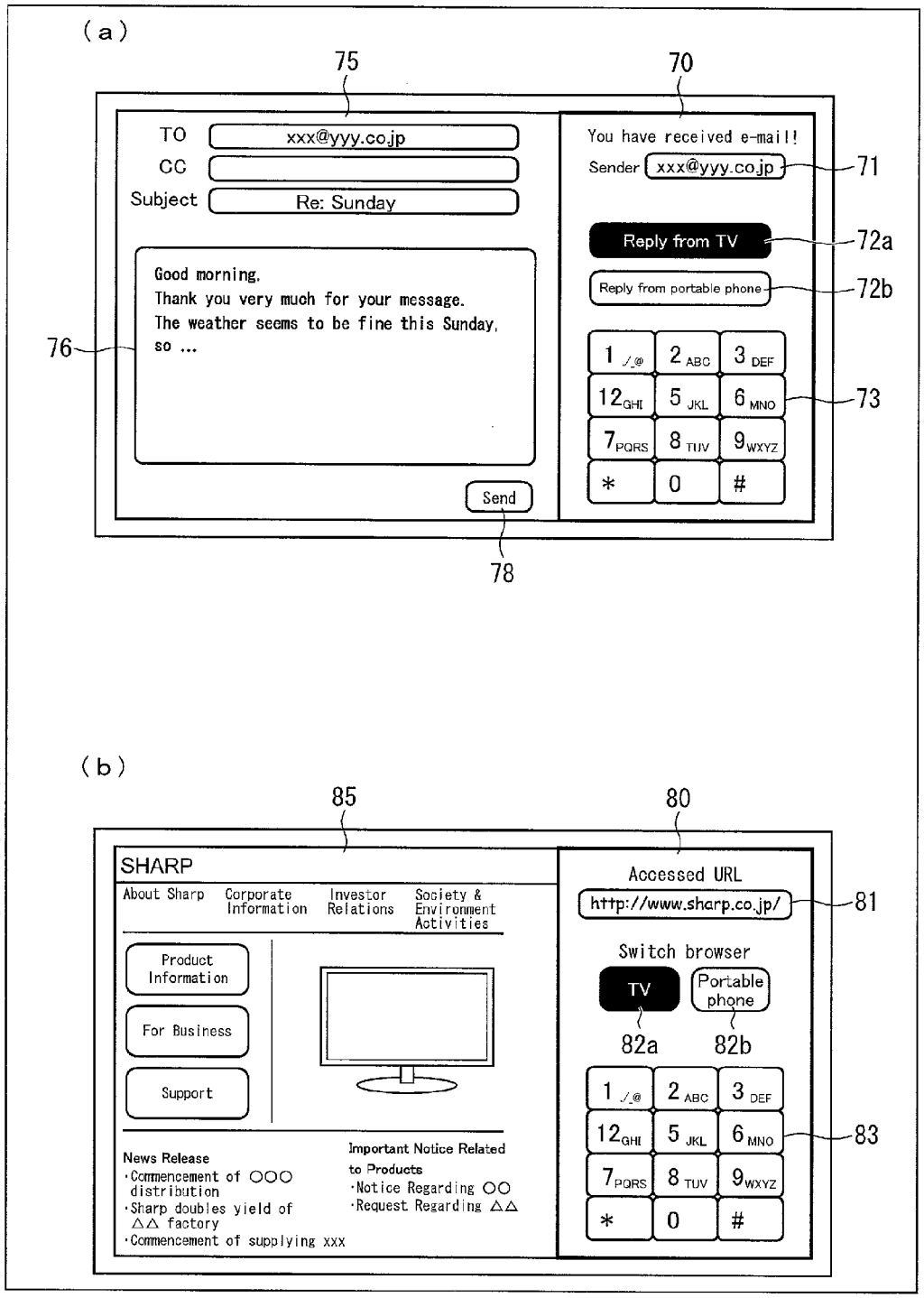
In FIG. 16, (a) is an example of a display screen displayed on the TV when an e-mail client running on a portable phone terminal receives an e-mail, and (b) is an example of a display screen displayed on the TV when a URL is selected or entered to a web browser running on the portable phone terminal.

FIG. 16(*a*) is an example of a display screen displayed on the TV 1 at a time at which an e-mail client running on the portable phone terminal 2 receives an e-mail. When an e-mail is received, the e-mail client running on the portable phone terminal 2 transmits a sender address of the received e-mail to the e-mail client running on the television 1, with use of a CEC command. When the e-mail client running on the TV 1 receives the sender address from the e-mail client running on the portable phone terminal 2, the e-mail client running on the TV 1 displays an operation panel 70 illustrated in FIG. 16(*a*).

The operation panel 70 includes, other than the sender address 71 of the e-mail received by the e-mail client of the portable phone terminal 2, buttons 72*a* and 72*b* to make a user select whether to send a reply from the e-mail client running on the TV 1 or to send a reply from the e-mail client running on the portable phone terminal 2.

In a case in which the user selects to send a reply from the e-mail client running on the TV 1, the e-mail client of the TV 1 displays a reply e-mail preparation screen 75 for preparing a reply to the sender address 71, as illustrated in FIG. 16(*a*). The user can freely edit a sending text 76 displayed on the reply e-mail preparation screen 75 with use of numeric keys 73 provided in the operation panel 70. After completing the editing of the sending text 76 and the user selects a send button 77, the e-mail client running on the TV 1 sends, to the sender address 71, the e-mail containing the sending text whose editing has been completed.

At this time, the e-mail client running on the TV 1 sends the e-mail via the Ethernet I/F 115. Accordingly, no communication charges that would be incurred when sending e-mail from the e-mail client running on the portable phone terminal 2, will be incurred.

FIG. 16(*b*) is an example of a display screen displayed on the TV 1, at a time in which the user enters or selects a URL on a web browser running on the portable phone terminal 2. When the user enters or selects a URL, the web browser running on the portable phone terminal 2 sends the URL entered or selected by the user to the web browser running on the TV 1 with use of a CEC command. When the web browser running on the TV 1 receives the URL from the web browser running on the portable phone terminal 2, the web browser running on of the TV 1 displays an operation panel 80 as illustrated in FIG. 16(*b*).

The operation panel 80 includes, other than a URL 81 entered or selected by the user on the web browser running on the portable phone terminal 2, buttons 82*a* and 82*b* to make a user select whether to make the TV 1 access the web page or to make the portable phone terminal 2 access the web page. In a case in which the user selects to access the web page from the TV 1, the web browser running on the TV 1 retrieves a resource specified by the URL 81, and displays the web page 85 with use of the retrieved resource, as illustrated in FIG. 16(*b*). Hence, it is possible to avoid communication charges from incurring, for retrieving the resource for displaying the web page with the web browser running on the portable phone terminal 2.

In the present embodiment, accessing a web page means to retrieve resources (hereinafter, referred to as "web resource") from a web server, and to display a web page with reference to the retrieved web resource, as already known. Typical web resources include, for example, HTML (Hypertext Markup Language) text, and image data representing a video or a still image that are embedded in a web page.

As described with reference to FIG. 16(*a*), the TV 1 has a function of sending an e-mail that should be carried out on the portable phone terminal 2, instead of the portable phone terminal 2. Moreover, in order to execute this function, the TV 1 is capable of acquiring an e-mail address indicative of a destination of that e-mail, from the portable phone terminal 2. In particular, when the sending process that should be carried out on the portable phone terminal 2 is the sending of a reply e-mail to an e-mail received by the portable phone terminal 2, the e-mail address acquired from the portable phone terminal 2 by the TV 1 is an e-mail address indicative of a sender of the e-mail received by the portable phone terminal 2 (=destination of the reply).

Moreover, as described with reference to FIG. 16(*b*), the TV 1 has a function of retrieving a web resource that should be retrieved by the portable phone terminal 2, instead of the portable phone terminal 2. In order to implement this function, the TV 1 has a function for retrieving a URL of that web resource, from the portable phone terminal 2.

Furthermore, as already described with reference to FIG. 9(*c*), the TV 1 has a function for executing a calling process for a telephonic communication, which process should be executed by the portable phone terminal 2. Moreover, in order to implement this function, the TV 1 has a function for retrieving, from the portable phone terminal 2, a phone number of the destination to call in the calling process. In particular, in a case in which the calling process that should be executed by the portable phone terminal 2 is a process of calling back to a call received by the portable phone terminal 2, the telephone number that the TV 1 is to retrieve from the portable phone terminal 2 is the telephone number of a caller of the call received by the portable phone terminal 2 (=destination for calling in the process of calling back).

As such, the TV 1 has (i) a communication information acquiring function that acquires communication information (e-mail address, URL, or telephone number) related to the communication processes that should be executed by the portable phone terminal 2, from the portable phone terminal 2 connected to the TV 1 via HDMI, and (ii) a communication process proxy function that executes, instead of the portable phone terminal 2, the communication process (e-mail sending process, web resource retrieving process, or calling process for making a phone call) based on the acquired communication information. As described above, in a case in which the communication information is to be transmitted as a CEC command, a HDMI receiver 100 serves as means for realizing the communication information retrieving function, and in a case in which these communication processes are realized with use of software, the CPU 118 that executes the communication application (e-mail client, web browser, calling application) serves as means for realizing the communication process proxy function.

In the present embodiment, it is preferable that the TV 1 uses a communication medium different from the communication medium used by the portable phone terminal 2, when the TV 1 carries out the communication process that should be executed by the portable phone terminal 2, instead of the portable phone terminal 2. It is as described above with reference to FIG. 8 that a communication medium suitable for the TV 1 is different from a communication medium suitable for the portable phone terminal 2. Further, it is as described above with reference to FIG. 9(c) that by using a communication medium different from the communication medium suitable for the portable phone terminal 2, it is possible to execute the same communication process more cheaply. In the present embodiment, a communication medium applicable for the portable phone terminal 2 in a communication process that makes use of the Internet includes an Internet connection service available from a portable phone carrier, which service applies a non-flat rate system (e.g. meter-rate system based on packet amount). On the other hand, a communication medium applicable for the TV 1 in the communication process that makes use of the Internet includes a flat rate Internet connection service available from an Internet service provider. Moreover, a communication medium applicable for the portable phone terminal 2 in a telephonic communication is a mobile phone network, and a communication medium applicable for the TV 1 in the telephonic communication is, for example, an IP telephone network or an optical telephone network.

(Controlling TV and Source Apparatus with Use of Portable Information Terminal)

The TV 1 may be operated with use of a remote controller as described above, or may be operated with use of a portable information terminal such as a smartphone or a tablet-type PC.

FIG. 18 is a view illustrating a configuration of a system 10' that is capable of operating the TV 1 with use of a portable information terminal 5. As illustrated in FIG. 18, the system 10' includes a TV 1, a source apparatus 2, a router 4, and a portable information terminal 5. The source apparatus 2 can be a portable phone terminal as described above, or alternatively, can be a source apparatus other than the portable phone terminal, for example a recording device or like device. The TV 1 can be a TV for stationary use, which is connected to a commercial power supply, or can be a portable TV (including a monitor that playbacks a video transmitted via a wireless LAN from an externally-connected tuner) having a built-in battery.

In the system 10' illustrated in FIG. 18, the TV 1 and the source apparatus 2 are connected to each other via an HDMI cable 3. The same applies for the system 10' as with the system 10 illustrated in FIG. 2(a) in that the TV 1 and the source apparatus 2 control each other interactively by use of a CEC command transmitted through the HDMI cable 3.

Furthermore, in the system 10' illustrated in FIG. 18, the TV 1 and the portable information terminal 5 are configured communicable with each other. A communication medium that supports the communication between the TV 1 and the portable information terminal 5 is not limited in particular. However, in the present embodiment, a router 4 is provided between the TV 1 and the portable information terminal 5. The TV 1 and the router 4 are connected via an Ethernet cable 6, whereas the portable information terminal 5 and the router 4 are connected via wireless LAN such as the IEEE 802.11 series. In a case in which the TV 1 has a wireless LAN interface, it is also possible to have a configuration in which the TV 1 and the router 4 are connected via a wireless LAN, or alternatively, a configuration in which the TV 1 and the portable information terminal 5 are connected via a wireless LAN without providing the router 4 therebetween.

It is preferable that the TV 1 and the portable information terminal 5 support UPnP (Universal Plug and Play). In this case, when the TV 1 and the portable information terminal 5 enter a service area of the router 4, the portable information terminal 5 can automatically detect the TV 1 that is connected to the router 4, with use of a protocol such as SDDP. In this case, the portable information terminal 5 retrieves a name of the TV 1.

The portable information terminal 5 is installed with an application for causing the portable information terminal 5 to function as a remote control of the TV 1 (hereinafter, referred to as "remote controller application"). The operation (IP control) of the TV 1 becomes possible with the portable information terminal 5 in a case in which the TV 1 is detected after the remote controller application is started, or alternatively, in a case in which the remote controller application is started after the TV 1 is detected. Note that in a case in which there are a plurality of UPnP compatible apparatuses such as the TV 1 within the LAN, the portable information terminal 5 displays a list of names of those UPnP compatible apparatuses for the user to select an apparatus to be operated.

Figure 19:
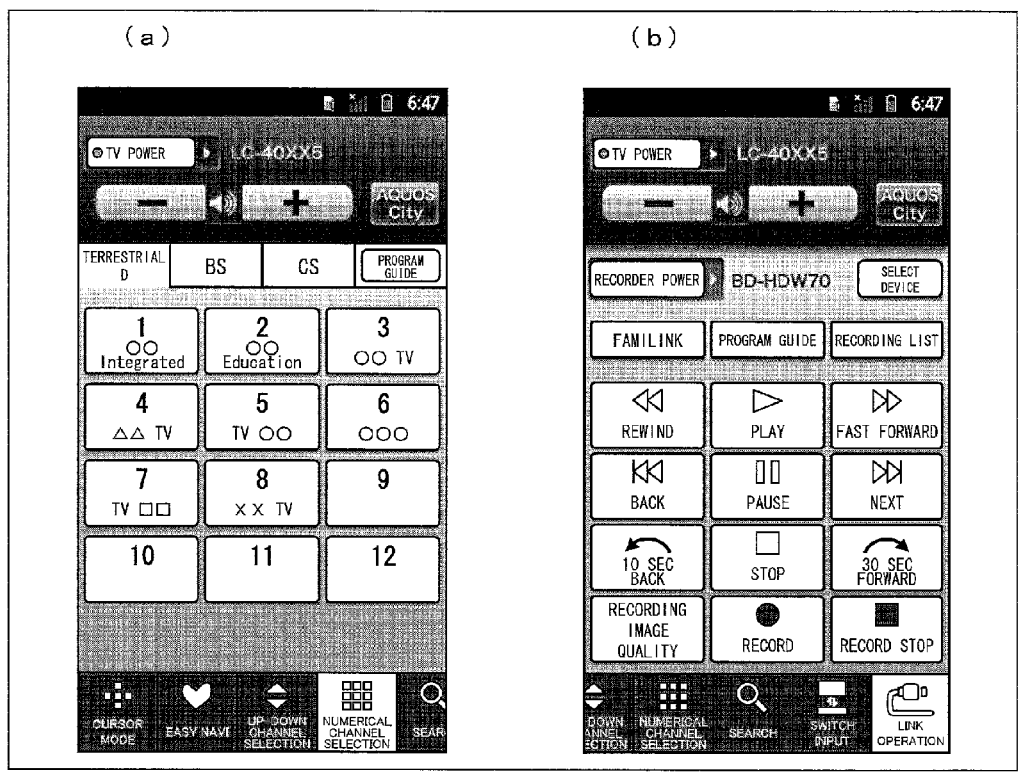
FIG. 19 is a view illustrating a configuration example of a display screen displayed on a touch panel of a portable information terminal; (a) is a display screen for operating a TV, and (b) is a display screen for operating a source apparatus.

FIG. 19(a) illustrates an example of a display screen that is displayed on a touch panel of the portable phone terminal 5, which display screen is generated by a remote controller application that runs on the portable information terminal 5. This display screen is an emulated remote controller. The display screen includes various keys for operating the TV 1, for example a power key on which it is written "TV power", volume adjustment keys on which it is written "−" or "+", and channel keys, each on which is written "1" to "12" together with their respective broadcasting station name. For example, when a channel key written with the number "1" is pressed, the remote controller application transmits to the TV 1a control command that instructs the TV 1 to switch the channel to Channel 1. The TV 1, in response to the received control command, switches the channel to Channel 1. At this time, in the TV 1, the Ethernet I/F 115 and the CPU 118 illustrated in FIG. 4 serve as the control command receiving means.

The remote controller application further has a function for operating the source apparatus 2, in addition to the function for operating the TV 1. More specifically, in a case in which the "link operation" key (provided on the lower part of the display screen illustrated in FIG. 19(a)) is pressed, a display screen as illustrated in FIG. 19(b) appears on the portable information terminal 5. The display screen illustrated in FIG. 19(b) includes various keys for operating the source apparatus 2, such as a rewind key, a play key, a fast forward key, etc. For example, when the play key is pressed, the remote controller application transmits a control command to the TV 1 that instructs the source apparatus 2 to start playing back a subject content. The TV 1 converts the received control command to a corresponding CEC command, and transmits the obtained CEC command to the source apparatus 2. The source apparatus 2, in response to the received CEC command, then starts to play back the subject content. At this time, in the television 1, the Ethernet I/F 115, the CPU 118, and the HDMI receiver 100 (see FIG. 4) serve as the control command transferring means.

Regarding the display screen for operating the source apparatus 2, the TV 1 can notify the logical address and/or the device type of the source apparatus 2 to the portable information terminal 5, so that the remote controller application operating on the portable information terminal 5 displays a display screen corresponding to the logical address and/or device type of the source apparatus 2. This configuration allows for the portable information terminal 5 to serve as a remote controller suitable for operating the source apparatus 2 connected to the TV 1 via HDMI, regardless of which type of source apparatus 2 the TV 1 is connected via HDMI.

Note that the remote controller application running on the portable information terminal 5 is based on an emulated remote controller of a conventional infrared ray remote controller. However, the remote controller application may further have functions that are not provided on the conventional infrared ray remote controllers. For example, other than the functions provided on the conventional infrared ray remote controller, it is also possible to make the remote controller application have the following functions.

1. URL jumping function, i.e., a function for starting a web browser running on the TV 1, to access a designated URL.

2. TV state acquisition function, i.e., a function for acquiring status information, setting information, and event information of the TV 1.

3. Text input function, i.e., a function for receiving entry of a text string with use of a software keyboard, and transmitting the entered text string to the TV 1.

4. Information notification function, i.e., a function for notifying the TV 1 of events that have occurred to the portable information terminal 5, such as an event of receiving a phone call or an event of receiving an e-mail.

5. Seamless searching function, i.e., a function for displaying results of a search by a keyword, searched from program information, a recording list, VOD titles, and in the Internet.

6. Friendly name setting function, i.e., a function for setting a friendly name (apparatus list name) of the TV 1, from the portable information terminal 5.

The foregoing description discusses a case in which the portable information terminal 5 and the source apparatus 2 communicate via the router 4 and the television 1. However, it is also possible to employ a configuration in which the portable information terminal 5 directly communicates with the source apparatus 2 via a wireless LAN. In this case, it is possible to directly send a control command for operating the source apparatus 2, from the portable information terminal 5 to the source apparatus 2.

(Program and Recording Medium)

Finally, the blocks of the TV 1 may be accomplished by way of hardware with use of a logic circuit formed on an integrated circuit (IC chip) or by way of software as executed by a CPU (Central Processing Unit).

In the latter case, the TV 1 includes a CPU and memory devices (memory media). The CPU executes instructions in programs performing the functions. The memory devices include a ROM (Read Only Memory) which contains programs, a RAM (Random Access Memory) to which the programs are loaded, and a memory containing the programs and various data. The objective of the present invention can also be achieved by mounting to the TV 1a computer-readable storage medium containing control program code (executable program, intermediate code program, or source program) for the TV 1, which is software performing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or logic circuits such as a PLD (Programmable logic device) or FPGA (Field Programmable Gate Array).

The TV 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (Virtual Private Network), telephone line network, mobile communications network, or satellite communications network. The transfer medium which makes up the communications network is also not limited to a set arrangement or kind as long as the transfer medium is capable of delivering the program code, and may be, for example, wired line, such as IEEE1394, USB, electric power line, cable TV line, telephone line, or ADSL (Asymmetric Digital Subscriber Line); or wireless, such as infrared radiation (IrDA, remote control), Bluetooth (Registered Trademark), IEEE802.11 wireless, HDR (High Data Rate), NFC (Near Field Communication), DLNA (Digital Living Network Alliance), mobile telephone network, satellite line, or terrestrial digital network.

(Communication Medium Replaceable with HDMI)

Figure 3:
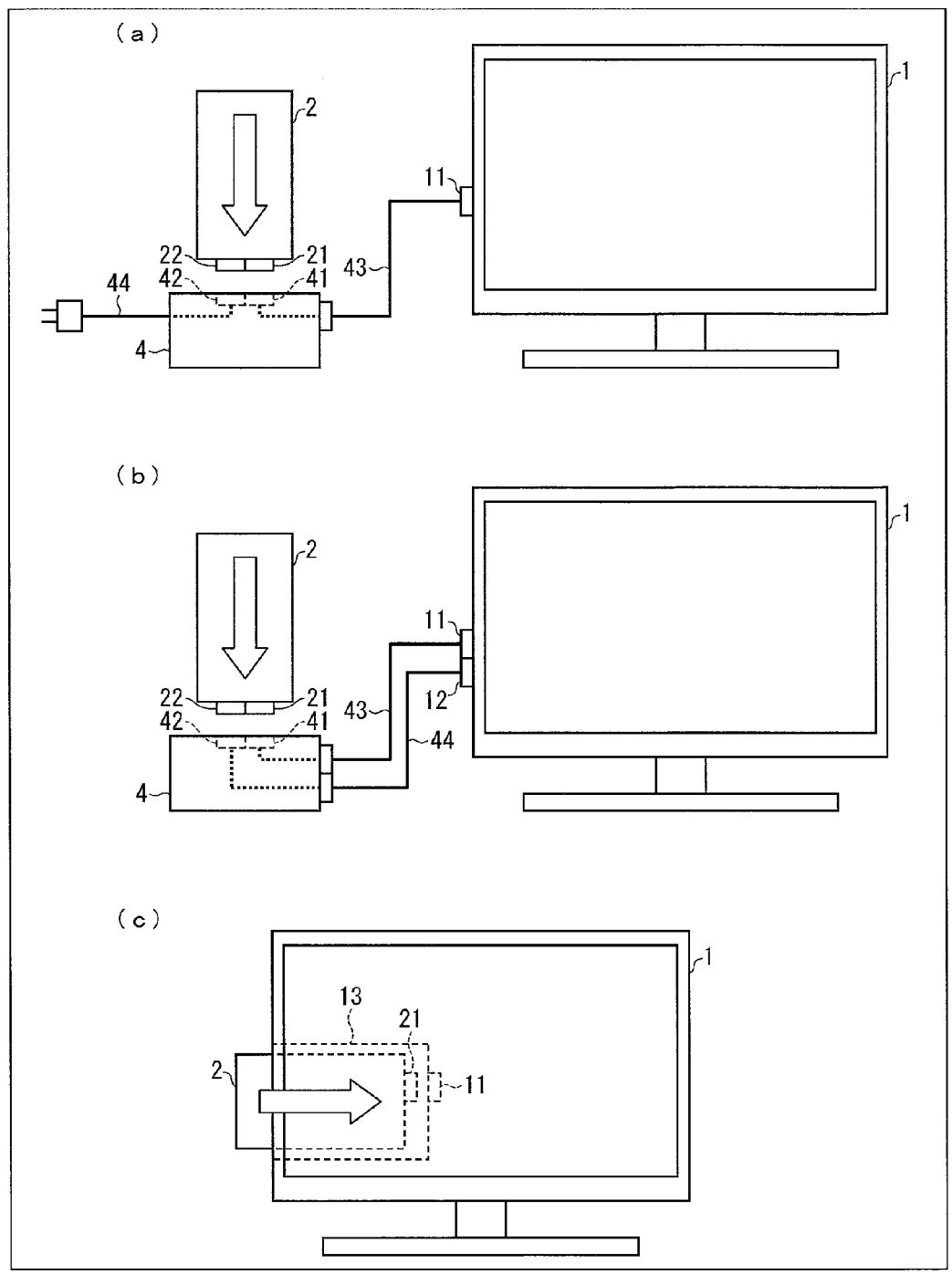
FIG. 3 is a view illustrating other aspects of a connection between the TV and the portable phone terminal illustrated in FIG. 2; (a) illustrates an aspect of a connection using a charging stand, (b) illustrates an aspect of a connection using a charging stand from which electricity is supplied from the TV, and (c) illustrates an aspect of a connection in which the portable phone terminal is loaded into a slot provided in the TV.

Note that a connection mode between the TV 1 and the portable phone terminal 2 is not limited to the wired communications illustrated in FIGS. 2 and 3. The TV 1 and the portable phone terminal 2 may be connected wirelessly, or may be connected by both a wired transmission medium and a wireless transmission medium.

As the wired transmission media applicable for the connection between the TV 1 and the portable phone terminal 2, the foregoing HDMI, USB, IEEE1394, Ethernet (registered trademark) and like system can be used, and wired transmission media applicable for the connection between the TV 1 and the portable phone terminal 2 encompass examples such as the foregoing IEEE802.11, Bluetooth, IrDA, IrSimple, etc.

(Additional Matters)

The present invention is not limited to the description of the embodiments above, but may be altered by a skilled person within the scope of the claims. An embodiment based on a proper combination of technical means disclosed in different embodiments is encompassed in the technical scope of the present invention.

The conventional television had a problem in that it could not identify the source apparatus connected via HDMI in details as to the kind of apparatus, other than whether the source apparatus is a playback device, a recording device, a tuner, or an audio device. This is because a logical address is used for identifying the kind of apparatus of the source apparatus that is connected to the television via HDMI.

Hence, when the user interface for operating the source apparatus is to be displayed on the television, even though it is possible to display a user interface for a playback device, a recording device, a tuner device, or an audio device, it was not possible to display a user interface for a portable device.

The following group of inventions is accomplished in view of the foregoing problem, and its object is to realize an output device for outputting a content supplied from a source apparatus, which output device can identify which kind of apparatus the source apparatus is in more details, as compared to the conventional device.

An output device according to the present invention is an output device for outputting a content supplied from a source apparatus, the output device including: first apparatus kind information acquisition means for acquiring, from the source apparatus, first apparatus kind information indicative of which kind of apparatus the source apparatus is classified into based on a first classification; second apparatus kind information acquisition means for acquiring, from the source apparatus, second apparatus kind information indicative of which kind of apparatus the source apparatus is classified into based on a second classification, the second classification being different from the first classification; and apparatus kind identification means for identifying which kind of apparatus the source apparatus is, on a basis of a combination of the first apparatus kind information acquired by the first apparatus kind information acquisition means and the second apparatus kind information acquired by the second apparatus kind information acquisition means.

Moreover, an output method according to the present invention is a method for outputting from an output device a content supplied from a source apparatus, the method including the steps of: (a) the output device acquiring, from the source apparatus, first apparatus kind information indicative of which kind of apparatus the source apparatus is classified into based on the first classification; (b) the output device acquiring, from the source apparatus, second apparatus kind information indicative of which kind of apparatus the source apparatus is classified into based on a second classification, the second classification being different from the first classification; and (c) the output device identifying which kind of apparatus of the source apparatus is, on a basis of a combination of (i) the first apparatus kind information acquired in the step (a) and (ii) the second apparatus kind information acquired in the step (b).

Moreover, a source apparatus according to the present invention is a source apparatus for supplying a content to an output device, the source apparatus including: first apparatus kind information providing means for providing to the output device first apparatus kind information indicative of which kind of apparatus the source apparatus is classified into based on a first classification; and second apparatus kind information providing means for providing to the output device second apparatus kind information indicative of which kind of apparatus the source apparatus is classified into based on a second classification, the second classification being different from the first classification.

Moreover, a system according to the present invention includes the output device and the source apparatus.

According to the foregoing configurations, a kind of apparatus of the source apparatus is identified on a basis of a combination of (i) which kind of apparatus the source apparatus is classified into based on the first classification and (ii) which kind of apparatus the source apparatus is classified into based on the second classification. Hence, it is possible to identify the kind of apparatus of the source apparatus more specifically, as compared to a case in which the kind of apparatus of the source apparatus is identified by only the kind of apparatus based on the first classification. Moreover, it is possible to make source apparatuses of different kinds, classified based on the first classification or classified based on the second classification, to perform different processes.

Note that the source apparatus can be a source apparatus supplying video content, a source apparatus supplying audio content, or an apparatus supplying video content and audio content. Moreover, the source apparatus can be a source apparatus that supplies electronic books. The output device can be an output device (display device) that outputs (displays) video content, an output device that outputs audio content, or an output device that outputs video content and audio content.

Moreover, the output device may be configured in such a manner that the acquisition of the second apparatus kind information from the source apparatus by the second apparatus kind information acquisition means can be triggered by an establishment of a connection between the output device and the source apparatus. The same applies with the first apparatus kind information acquisition means.

In the output device according to the present invention, it is preferable that the second apparatus kind information acquisition means acquires the second apparatus kind information from the source apparatus only when the first apparatus kind information is apparatus kind information indicative of a particular kind of apparatus, and the apparatus kind identification means identifies which kind of apparatus the source apparatus, which is classified as the particular kind apparatus based on the first classification, is on a basis of the second apparatus kind information.

According to the foregoing configuration, it is possible to avoid the second apparatus kind information acquisition means from uselessly acquiring the second apparatus kind information, in a case in which a source apparatus that needs to be identified more thoroughly as to which kind of apparatus the source apparatus is, is only the source apparatus classified as the particular apparatus based on the first classification.

For example, in CEC protocol, a portable phone terminal is normally classified as a playback device. Consequently, a source apparatus that requires to be identified as to whether or not it is a portable phone terminal is only the playback device. In this case, it is effective to have a configuration in which the second apparatus kind information acquisition means acquires the second apparatus kind information from the source apparatus only when the logical address (the first apparatus kind information) is any one of those of the playback devices 1 to 3 (particular kind of apparatus), and the apparatus kind identification means identifies the source apparatus based on the second apparatus kind information.

It is preferable that the output device according to the present invention further includes vendor information acquisition means for acquiring, from the source apparatus, vendor information indicative of a vendor that manufactured or distributed the source apparatus, the second apparatus kind information acquisition means acquiring the second apparatus kind information only when the vendor information acquired from the vendor information acquisition means is vendor information indicative of a particular vendor, and the apparatus kind identification means identifying which kind of apparatus the source apparatus manufactured or distributed by the particular vendor is on a basis of the second apparatus kind information.

According to the foregoing configuration, it is possible to avoid the second apparatus kind information acquisition means from uselessly acquiring the second apparatus kind information from a source apparatus manufactured or distributed from a vendor other than the particular vendor; the source apparatus manufactured or distributed from a vendor other than the particular vendor may not be able to supply the second apparatus kind information.

Note that in a case in which the second classification is configured to classify source apparatuses into two kinds of apparatuses, it is possible to employ a configuration in which, for example, the second apparatus kind information acquisition means requests the source apparatus to provide the second apparatus kind information, and only when the source apparatus is a source apparatus classified as a particular kind of apparatus based on the second classification, the second apparatus kind information acquisition means acquires the second apparatus kind information from the source apparatus, and the apparatus kind identification means identifies whether or not the source apparatus is the source apparatus classified as the particular kind of apparatus based on the second classification, on a basis of whether or not the second apparatus kind information acquisition means acquired the second apparatus kind information.

In particular, in a case in which the second classification is configured to classify source apparatuses into portable devices and non-portable devices, it is possible to employ a configuration in which, for example, the second apparatus kind information acquisition means requests the source apparatus to provide the second apparatus kind information, and only when the source apparatus is a portable device, the second apparatus kind information acquisition means acquires the second apparatus kind information from the source apparatus, and the apparatus kind identification means identifies whether or not the source apparatus is a portable device, on a basis of whether or not the second apparatus kind information acquisition means acquired the second apparatus kind information.

It is preferable that the output device according to the present invention further include user interface display means for displaying a user interface via which the source apparatus is operated, the user interface displaying means displaying the user interface suitable for the kind of apparatus of the source apparatus identified by the apparatus kind identification means. Moreover, it is preferable that the output device according to the present invention further include command issuing means for issuing a command to the source apparatus in response to an entry of a user operation on the user interface, the command being associated with the user operation.

According to the configuration, it is possible to make a user operate the source apparatus with use of a user interface corresponding to the kind of apparatus of the source apparatus.

Note that the user interface display means can be configured in such a manner that start of the display of the user interface by the user interface display means is triggered by an establishment of a connection with the source apparatus, and termination of the display of the user interface by the user interface display means is triggered by the connection with the source apparatus being disconnected. Moreover, the user interface display means may be configured so that the user interface display means displays a user interface corresponding to the kind of apparatus of a source apparatus connected most recently to the output device, out of source apparatuses connected to the output device.

In the output device according to the present invention, it is preferable that the command issuing means issues a command for operating a communication application that runs on the source apparatus.

According to the configuration, it is possible to use a communication function provided on the portable device, from the output device.

In the output device according to the present invention, it is preferable that the communication application is an e-mail client.

According to the configuration, it is possible to use an e-mail client function provided on the portable device, from the output device.

In a case in which the output device according to the present invention is a sink device for outputting a content supplied from the source apparatus via a HDMI cable, and the first apparatus kind information acquisition means and the second apparatus kind information acquisition means acquire the first apparatus kind information and the second apparatus kind information, respectively, with use of a CEC command transmitted via the HDMI cable.

Note that the source apparatus may be configured so as to be connected to the output device via USB, IEEE1394, Ethernet, IEEE802.11, Bluetooth, IrDA, or IrSimple.

It is preferable that the output device according to the present invention includes at least one of (i) control command receiving means for receiving a control command for controlling the output device, the control command having been transmitted from a portable information terminal, and (ii) control command transferring means for (a) converting (I) a control command having been transmitted from the portable information terminal and being for controlling the source apparatus, to (II) a CEC command corresponding to the control command and (b) transmitting the CEC command to the source apparatus.

With the foregoing configuration, it is possible to operate the output device and the source apparatus from a portable information terminal.

Moreover, the scope of the present invention also encompasses a computer-readable recording medium on which a program is stored, which program causes a computer to operate as each of the means of the output device.

A portable phone terminal connected to a conventional television is located near the television (within a range of a length of a cable in a case of wired connection such as HDMI, and within a range in which carrier waves can be received in a case of wireless connection). Hence, in order to make the portable phone terminal execute a communication process, it is necessary to hold the portable phone terminal that is connected to the television in the hands of a user, which caused inconvenience for the user. As a solution for these problems, the present specification discloses the following group of inventions.

1. A display device including control means for issuing a command to a portable device connected via an interface, to (i) select a communication application to be run on the portable device or (ii) control the communication application that is running on the portable device.

According to the configuration, it is possible to select a communication application to be run on the portable device and control a communication application that is running on the portable device, via the display device. That is to say, it is possible to utilize the communication function in the portable device, without having to operate the portable device directly by hand.

2. The display device according to 1, further including operation panel display means for displaying on a display an operation panel for causing a user to select a command to be transmitted to the portable device.

According to the configuration, the user can carry out operation for selecting a communication application to be operated on the portable device and controlling a communication application operating on the portable device, while looking at an operation panel displayed on the display. Hence, a further effect is brought about that it becomes easier, with use of the display device, to select the communication application to be run and to control the communication application running on the portable device.

3. The display device according to 2, further including GUI display means for displaying a GUI (Graphical User Interface) on the display in response to a video signal supplied from the portable device via the interface, the GUI being generated by the communication application, wherein the operation panel display means displays the operation panel in such a manner that the operation panel is superimposed on the GUI displayed by the GUI display means.

According to the configuration, the user can carry out operations for controlling the communication application that is running on the portable device, while viewing the GUI displayed on the display, which GUI is generated by the communication application that is running on the portable device. Accordingly, a further effect is brought about that it becomes easier, with use of the display device, to select the communication application to be run on the portable device and to control the communication application running on the portable device.

4. The display device according to 2, further comprising video display means for displaying a video on the display in response to a video signal received via a tuner, wherein the operation panel display means displays the operation panel in such a manner that the operation panel is superimposed on the video displayed by the video display means.

According to the configuration, the user can carry out operations for selecting a communication application to be run on the portable device or for controlling the communication application running on the portable device, while viewing a received video (video represented by the video signal received by the tuner). This further brings about an effect that it is possible to avoid obstructing the viewing of a received video when selecting the communication application to be run on the portable device or controlling the communication application running on the portable device, with use of the display device.

5. The display device according to any one of 1 to 4, wherein the portable device is a portable phone terminal, the operation panel includes numeric keys arranged as arranged on a telephone, and the control means transmits a command to the portable phone terminal when the user selects any one of buttons of the numeric keys, the command being an instruction for executing a process corresponding to the selected button.

According to the configuration, it is possible to realize any operation that can be realized with use of the numeric keys on the portable phone terminal, with use of the operation panel.

6. The display device according to 1 to 5, wherein the interface is a HDMI (High-Definition Multimedia Interface).

According to the configuration, it is possible to transmit the command transmitted from the display device to the portable device and the video signal and audio signal transmitted from the portable device to the display device, by one cable.

7. Note that the interface is not limited to HDMI. For example, the interface can be any one of USB, IEEE1394, Ethernet, IEEE802.11, Bluetooth, IrDA, and IrSimple.

8. The display device according to 1 to 7, wherein the control means issues, to the portable device, a command corresponding to a user operation carried out to a remote controller for remotely operating the display device.

According to the configuration, it is possible to realize the selection or control of the communication application running on the portable device, not by operating the portable device, but by operating the remote controller. In particular, in a case in which a GUI generated by the communication application running on the portable device is to be displayed on the display of the display device, it is possible to carry out the operation that was made to a portable device while looking at a small display of the portable device, to a remote controller while viewing a large display (can be of any size as long as it is larger than the display of the portable device) of the display device.

Moreover, the scope of the present invention further encompasses a system including the display device and the portable device, a method for controlling the portable device from the display device, and a program for causing a computer to operate as the display device.

The conventional television includes no mechanism for identifying who a user that is viewing a video is. Hence, the conventional television has a problem in that it is not possible to display a video according to a preference of the user. As a solution for solving this problem, the present specification discloses the following group of inventions.

1. A display device including: individual/personal information acquisition means for acquiring, from a portable device connected via an interface, (a) individual information for distinguishing the portable device from another portable device or (b) personal information for distinguishing a user of the portable device from another user; and display means for displaying a video on a display and changing the video to be displayed in response to the individual information or personal information acquired by the individual/personal information acquisition means.

Typically, the portable device such as a portable phone terminal is possessed by a particular user. Hence, by changing the video displayed in response to the individual information or personal information acquired from the portable device connected to the display device, it is possible to display a video that corresponds to a user who is using the display device.

2. The display device according to 1, further including video processing means for adjusting image quality of the video displayed by the display means to an image quality in accordance with the individual information or the personal information acquired by the individual/personal information acquisition means.

According to the configuration, it is possible to adjust the image quality of the displayed video to an image quality in accordance with a user who is using the display device.

3. The display device according to 1 or 2, further including audio processing means for adjusting a sound quality of audio outputted together with the video displayed by the display means, to a sound quality in response to the individual information or personal information acquired by the individual/personal information acquisition means.

According to the configuration, it is possible to adjust the sound quality of the output audio to a sound quality in response to a user who is using the display device.

4. The display device according to 1 to 3, further comprising GUI generating means for generating a GUI displayed by the display means, the GUI display means generating a GUI corresponding to the individual information or personal information acquired by the individual/personal information acquisition means.

According to the configuration, it is possible to adjust the GUI displayed to a GUI corresponding to a user who is using the display device.

5. The display device according to 1 to 4, further including content acquisition means for acquiring a content displayed by the display means, the content acquisition means acquiring a content corresponding to the individual information or personal information acquired by the individual/personal information acquisition means.

According to the configuration, it is possible to change the content of the displayed video to a content corresponding to a user who is using the display device.

6. The display device according to 1 to 5, wherein the individual information or personal information is information retrieved from a USIM (Universal Subscriber Identity Module) card built in the portable device.

According to the configuration, it is made possible to use a telephone number or the like for identifying a user who is using the display device.

7. The display device according to any one of 1 to 6, wherein the interface is a HDMI (High-Definition Multimedia Interface).

According to the configuration, it is possible to transmit (i) individual information or personal information transmitted from the portable device to the display device and (ii) a video signal and audio signal transmitted from the portable device to the display device, with use of one cable.

Note that the interface is not limited to HDMI. For example, the interface may be any one of USB, IEEE1394, Ethernet, IEEE802.11, Bluetooth, IrDA, and IrSimple.

Moreover, the scope of the present invention further encompasses a system including the display device and the portable device, a method for displaying the video on the display device, and a program for causing a computer to operate as the display device.

A portable phone terminal connected to a conventional television is located near the television (within a range of a length of a cable in a case of wired connection such as HDMI, and within a range in which carrier waves can be received in a case of wireless connection). Hence, in order to make the portable phone terminal execute a communication process, it is necessary to hold the portable phone terminal that is connected to the television in the hands of a user, which caused inconvenience for the user. As a solution for these problems, the present specification discloses the following group of inventions.

1. A display device having a communication function, the display device including: communication information acquisition means for acquiring, from a portable device connected via an interface, communication information related to a communication process that is to be executed by the portable device; and communication process proxy means for executing a communication process that is to be executed by the portable device, instead of the portable device, based on the communication information acquired by the communication information acquisition means.

According to the configuration, it is possible to have the display device carry out the communication process that should be carried out by the portable device, instead of the portable device. Namely, it is possible to execute the communication process that should be executed by the portable device, without having to operate the portable device directly by hand.

2. The display device according to 1, wherein the communication process proxy means carries out the communication process instead of the portable device, with use of a communication network different from the communication network that the portable device would use for the communication process.

According to the configuration, it is possible to perform the communication process that should be executed by the portable device, more cheaply.

3. The display device according to 1 or 2, further including display means for displaying, on the display, (i) a GUI (Graphical User Interface) generated by the portable device in a case in which the communication process is executed by the portable device, the GUI being generated based on a video signal supplied from the portable device via the interface, and (ii) a GUI generated by the display device in a case in which the communication process is carried out by the display device, instead of the portable device.

According to the configuration, regardless of whether the communication process is executed by the portable device or by the display device, a user can operate the apparatus that executes the communication process while looking at a GUI displayed on a particular display.

4. The display device according to 1 to 3, wherein the communication process is a transmission process for transmitting an e-mail, and the communication information is an email address indicative of a destination of the e-mail.

According to the configuration, it is possible to make the display device carry out a transmission process of an e-mail that should be carried out by the portable device, instead of the portable device.

5. The display device according to 3, wherein the communication process is a process of replying to an e-mail received by the portable device, and the communication information is an email address indicative of a sender of the received e-mail.

According to the configuration, it is possible to have the display device carry out the process of replying to an e-mail that should be carried out by the portable device, instead of the portable device.

6. The display device according to 1 to 3, wherein the communication process is a process of receiving a resource on the web, and the communication information is a URL (Uniform Resource Locator) of the resource.

According to the configuration, it is possible to make the display device carry out a retrieving process of a web resource that should be carried out by the portable device, instead of the portable device.

7. The display device according to 1 to 3, wherein the communication process is a calling process to make a telephonic communication, and the communication information is a telephone number indicative of a calling destination.

According to the configuration, it is possible to make the display device carry out the calling process for making a telephonic communication that should be carried out by the portable device, instead of the portable device.

8. The display device according to 7, wherein the communication process is a process of calling back to a call received by the portable device, and the communication information is a telephone number indicative of a caller of the call received by the portable device.

According to the configuration, it is possible to make the display device carry out the process of calling back that should be carried out by the portable device, instead of the portable device.

9. The display device according to 1 to 8, wherein the interface is a HDMI (High-Definition Multimedia Interface).

According to the configuration, it is possible to transmit (i) communication information transmitted from the portable device to the display device, and (ii) a video signal and audio signal transmitted from the portable device to the display device, with use of one cable.

10. The interface is not limited to HDMI. For example, the interface can be any one of USB, IEEE1394, Ethernet, IEEE802.11, Bluetooth, IrDA, and IrSimple.

11. The display device according to 1 to 10, wherein the communication process proxy means carries out a communication process that should be carried out by the portable device instead of the portable device, when a predetermined user operation is entered to a remote controller for remotely controlling the display device.

According to the configuration, it is possible to switch between whether to have a communication process be executed by a portable device or be executed by a display device instead, without directly operating the portable device.

Note that the present invention is not limited to a display device, and is extendedly applicable to general communication devices that have a communication function. Namely, the following communication devices also are within the scope of the present invention.

12. A communication device including: communication information acquisition means for acquiring, from another communication device connected via an interface, communication information related to a communication process that the another communication device should carry out; and communication process proxy means for carrying out a communication process that should be executed by the another communication device instead of the another communication device, based on the communication information acquired by the communication information acquisition means.

According to the configuration, it is possible to have a communication process that should be executed by a first communication device be executed by a second communication device, instead. Namely, it is possible to execute the communication process that should be executed by the first communication device, without operating the first communication device.

Moreover, the scope of the present invention also encompasses a system including the display device and the portable device, a method for carrying out the communication process instead by the display device, and a program for causing a computer to operate as the display device.

INDUSTRIAL APPLICABILITY

An output device according to the present invention is applicable to general source apparatuses that output a content supplied from a source apparatus.

REFERENCE SIGNS 1 television
11a to 11c HDMI input terminal
11d HDMI switch
100 HDMI receiver
151 TMDS receiver
152 CEC•I/F
153 DDC•I/F
154 HPD control section
155 5 v power detecting section
156 EDID storage section
101a video input terminal
101b audio input terminal
102 BD drive
103 tuner
104 IP broadcasting tuner
105 satellite broadcasting tuner
106 OSD generating section
107 video selector
108 video processing circuit
109 LCD controller
110 LCD
111 audio selector
112 audio processing circuit
113 digital amplifier
114 speaker
115 Ethernet I/F
116 ROM
117 RAM
118 CPU
301 address acquiring section
302 device type acquiring section
303 management table updating section
304 input source selection section
305 UI section
119 infrared ray receiving section
120 camera
121 human-detecting sensor
2 portable phone terminal
200 HDMI transmitter
251 TMDS transmitter
252 CEC•I/F
253 DDC•I/F
254 HPD detection
255 5V power control section
PN packet network
IN Internet

The invention claimed is:

1. An output device for outputting a content supplied from a source apparatus, the output device comprising:
first apparatus kind information acquisition section configured to acquire, from the source apparatus, first apparatus kind information indicative of which kind of apparatus the source apparatus is classified into based on a first classification;
second apparatus kind information acquisition section configured to acquire, from the source apparatus, second apparatus kind information indicative of which kind of apparatus the source apparatus is classified into based on a second classification, the second classification being different from the first classification, the second classification allowing source apparatuses to be distinguished from portable devices and other terminals;
an apparatus kind identification section configured to identify which kind of apparatus the source apparatus is, on a basis of a combination of the first apparatus kind information acquired by the first apparatus kind information acquisition section and the second apparatus kind information acquired by the second apparatus kind information acquisition section;
a retrieving section configured to retrieve data from a storage section which is included in the output device and in which the data is stored in advance, the data being required for drawing a user interface that is suitable for the kind of apparatus of the source apparatus identified by the apparatus kind identification section, via which user interface the source apparatus is operated; and
a user interface displaying section configured to display the user interface with use of the data retrieved by the retrieving section.

2. The output device according to claim 1, wherein the second apparatus kind information acquisition means acquires the second apparatus kind information from the source apparatus only when the first apparatus kind information is apparatus kind information indicative of a particular kind of apparatus, and
the apparatus kind identification means identifies which kind of apparatus the source apparatus, which is classified as the particular kind apparatus based on the first classification, is on a basis of the second apparatus kind information.

3. The output device according to claim 1, further comprising:
vendor information acquisition means for acquiring, from the source apparatus, vendor information indicative of a vendor that manufactured or distributed the source apparatus,
the second apparatus kind information acquisition means acquiring the second apparatus kind information only when the vendor information acquired from the vendor information acquisition means is vendor information indicative of a particular vendor, and
the apparatus kind identification means identifying which kind of apparatus the source apparatus manufactured or distributed by the particular vendor is on a basis of the second apparatus kind information.

4. The output device according to claim 1, wherein the second apparatus kind information acquisition means requests the source apparatus to provide the second apparatus kind information, and only when the source apparatus is a portable device, the second apparatus kind information acquisition means acquires the second apparatus kind information from the source apparatus, and the apparatus kind identification means identifies whether or not the source apparatus is a portable device, on a basis of whether or not the second apparatus kind information acquisition means acquired the second apparatus kind information.

5. The output device according to claim 1, further comprising:

command issuing section configured to issue a command to the source apparatus in response to an entry of a user operation on the user interface, the command being associated with the user operation.

6. The output device according to claim 5, wherein the command issuing section issues a command for operating a communication application that runs on the source apparatus.

7. The output device according to claim 6, wherein the communication application is an e-mail client.

8. The output device according to claim 1, further comprising:

process execution section configured to execute, in response to an entry of a user operation, a process associated with the user operation entered on the user interface.

9. The output device according to claim 1, wherein the acquisition of the second apparatus kind information from the source apparatus by the second apparatus kind information acquisition means is triggered by an establishment of a connection between the output device and the source apparatus.

10. The output device according to claim 1, wherein start of the display of the user interface by the user interface display section is triggered by an establishment of a connection with the source apparatus, and termination of the display of the user interface by the user interface display section is triggered by the connection with the source apparatus being disconnected.

11. The output device according to claim 1, wherein the user interface display section displays a user interface corresponding to the kind of apparatus of a source apparatus connected most recently to the output device, out of source apparatuses connected to the output device.

12. The output device according to claim 1, wherein the output device is a sink device for outputting a content supplied from the source apparatus via a HDMI cable, and the first apparatus kind information acquisition means and the second apparatus kind information acquisition means acquire the first apparatus kind information and the second apparatus kind information, respectively, with use of a CEC command transmitted via the HDMI cable.

13. The output device according to claim 1, wherein the source apparatus is connected to the output device via USB, IEEE1394, Ethernet, IEEE802.11, Bluetooth, IrDA, or IrSimple.

14. The output device according to claim 1, further comprising at least one of (i) control command receiving means for receiving a control command for controlling the output device, the control command having been transmitted from a portable information terminal, and (ii) control command transferring means for (a) converting (I) a control command having been transmitted from the portable information terminal and being for controlling the source apparatus, to (II) a CEC command corresponding to the control command and (b) transmitting the CEC command to the source apparatus.

15. A television receiver comprising an output device recited in claim 1.

16. An output method for outputting from an output device a content supplied from a source apparatus, the method comprising the steps of:

(a) the output device acquiring, from the source apparatus, first apparatus kind information indicative of which kind of apparatus the source apparatus is classified into based on the first classification;

(b) the output device acquiring, from the source apparatus, second apparatus kind information indicative of which kind of apparatus the source apparatus is classified into based on a second classification, the second classification being different from the first classification, the second classification allowing source apparatuses to be distinguished from portable devices and other terminals;

(c) the output device identifying which kind of apparatus of the source apparatus is, on a basis of a combination of (i) the first apparatus kind information acquired in the step (a) and (ii) the second apparatus kind information acquired in the step (b);

(d) the output device retrieving data from a storage section which is included in the output device and in which the data is stored in advance, the data being required for drawing a user interface suitable for the kind of apparatus of the source apparatus identified in the step (c), via which user interface the source apparatus is operated; and (e) the output device displaying the user interface with use of the data retrieved in step (d).

17. A non-transitory computer-readable recording medium on which a program is stored, the program being a program for causing a computer to operate as each of sections of an output device recited in claim 1.

* * * * *